United States Patent [19]
Kato

[11] Patent Number: 5,633,958
[45] Date of Patent: May 27, 1997

[54] BASIC CELL FOR FIRING SPATIO-TEMPORAL PULSES AND PATTERN RECOGNITION UNIT USING THE SAME

[75] Inventor: Haruo Kato, Sapporo, Japan

[73] Assignee: Advantest Corp., Tokyo, Japan

[21] Appl. No.: 650,028

[22] Filed: May 17, 1996

Related U.S. Application Data

[63] Continuation of Ser. No. 211,299, filed as PCT/JP93/01053, Jul. 27, 1993, published as WO94/03870, Feb. 17, 1994, abandoned.

[30] Foreign Application Priority Data

| Jul. 31, 1992 | [JP] | Japan | 4-205499 |
| Jul. 31, 1992 | [JP] | Japan | 4-205500 |
| Jul. 31, 1992 | [JP] | Japan | 4-205501 |
| Sep. 9, 1992 | [JP] | Japan | 4-240614 |

[51] Int. Cl.$^6$ .............................. G06K 9/54; H04N 5/14
[52] U.S. Cl. ........................ 382/302; 382/107; 348/700
[58] Field of Search .................... 348/700, 181; 382/107, 302, 307, 100

[56] References Cited

U.S. PATENT DOCUMENTS

| 3,652,990 | 3/1972 | Darwin | 382/191 |
| 4,601,055 | 7/1986 | Kent | 382/49 |
| 5,099,322 | 3/1992 | Gove | 348/700 |

OTHER PUBLICATIONS

Microelectronics Journal, vol. 6, No. 4, Jun. 1975, Luton GB, pp. 30–42, M. J. D. Wilson and I. Alexander, "*RAM, ROM, PROM Circuits For Simple Image Processing*".

English translation of International Search Report mailed Aug. 31, 1993; Technical Search Report of IECE, vol. 79, No. 242, PRL79-92, Ko Yamada et al., "A system of parallel pattern processing", p. 37, Figs. 2, 3.

IEEE Transactions on Electronic Computers, vol. EC–12, No. 5, Dec. 1963, Bruce H. McCormick, "The Illinois Pattern Recognition Computer–ILLIAC III".

*Primary Examiner*—Jose L. Couso
*Assistant Examiner*—Matthew C. Bella
*Attorney, Agent, or Firm*—Staas & Halsey

[57] ABSTRACT

A spatio-temporal pulse firing basic cell has a time input port $a^t$, a plurality of space input ports $b_0$–$b_u$, a time output port $a^{t+1}$, a plurality of space output ports $c_0$–$c_u$ and a calculating circuit for obtaining time output data and space output data from time input data and space input data, and the basic cell is configured so that time output data is provided as the next time input data to the time input port. The calculating circuit inverts the time input data or holds it uninverted, depending upon whether the added value of the whole space input data is larger or smaller than a predetermined threshold value, and provides it as the time output data, and at the same time, the calculating circuit inverts the whole space input data or holds it uninverted, in accordance with the logic of the time input data, and provides it as the space output data. A plurality of basic cells are arranged in a matrix form corresponding to matrix-arranged pixels and space output ports and space input ports of each basic cell are connected to space input ports and space output ports of a plurality of other basic cells, respectively, to form a spatio-temporal pulse generator.

9 Claims, 21 Drawing Sheets

11,13,15,16: LATCH
12: COMPARATOR
14: ADDER

FIG. 5

| k | j | y | x | w |
|---|---|---|---|---|
| l | a | h | g | v |
| m | b | i | f | u |
| n | c | d | e | t |
| o | p | q | r | s |

```
0 0 0 0 0 0 0 0 0 0 0 0 0 0 0 0 0 0 0
0 0 0 0 0 0 0 0 0 0 0 0 0 0 0 0 0 0 0
0 0 0 0 0 0 0 0 0 0 0 0 0 0 0 0 0 0 0
0 0 0 0 0 0 0 0 0 0 0 0 0 0 0 0 0 0 0
0 0 0 0 0 1 1 1 1 1 1 1 1 1 0 0 0 0 0
0 0 0 0 0 1 0 0 0 0 0 0 0 1 0 0 0 0 0
0 0 0 0 0 1 0 0 0 0 0 0 0 1 0 0 0 0 0
0 0 0 0 0 1 0 0 0 0 0 0 0 1 0 0 0 0 0
0 0 0 0 0 1 0 0 0 0 0 0 0 1 0 0 0 0 0
0 0 0 0 0 1 0 0 0 0 0 0 0 1 0 0 0 0 0
0 0 0 0 0 1 0 0 0 0 0 0 0 1 0 0 0 0 0
0 0 0 0 0 1 0 0 0 0 0 0 0 1 0 0 0 0 0
0 0 0 0 0 1 0 0 0 0 0 0 0 1 0 0 0 0 0
0 0 0 0 0 1 1 1 1 1 1 1 1 1 0 0 0 0 0
0 0 0 0 0 0 0 0 0 0 0 0 0 0 0 0 0 0 0
0 0 0 0 0 0 0 0 0 0 0 0 0 0 0 0 0 0 0
0 0 0 0 0 0 0 0 0 0 0 0 0 0 0 0 0 0 0
0 0 0 0 0 0 0 0 0 0 0 0 0 0 0 0 0 0 0
0 0 0 0 0 0 0 0 0 0 0 0 0 0 0 0 0 0 0
```

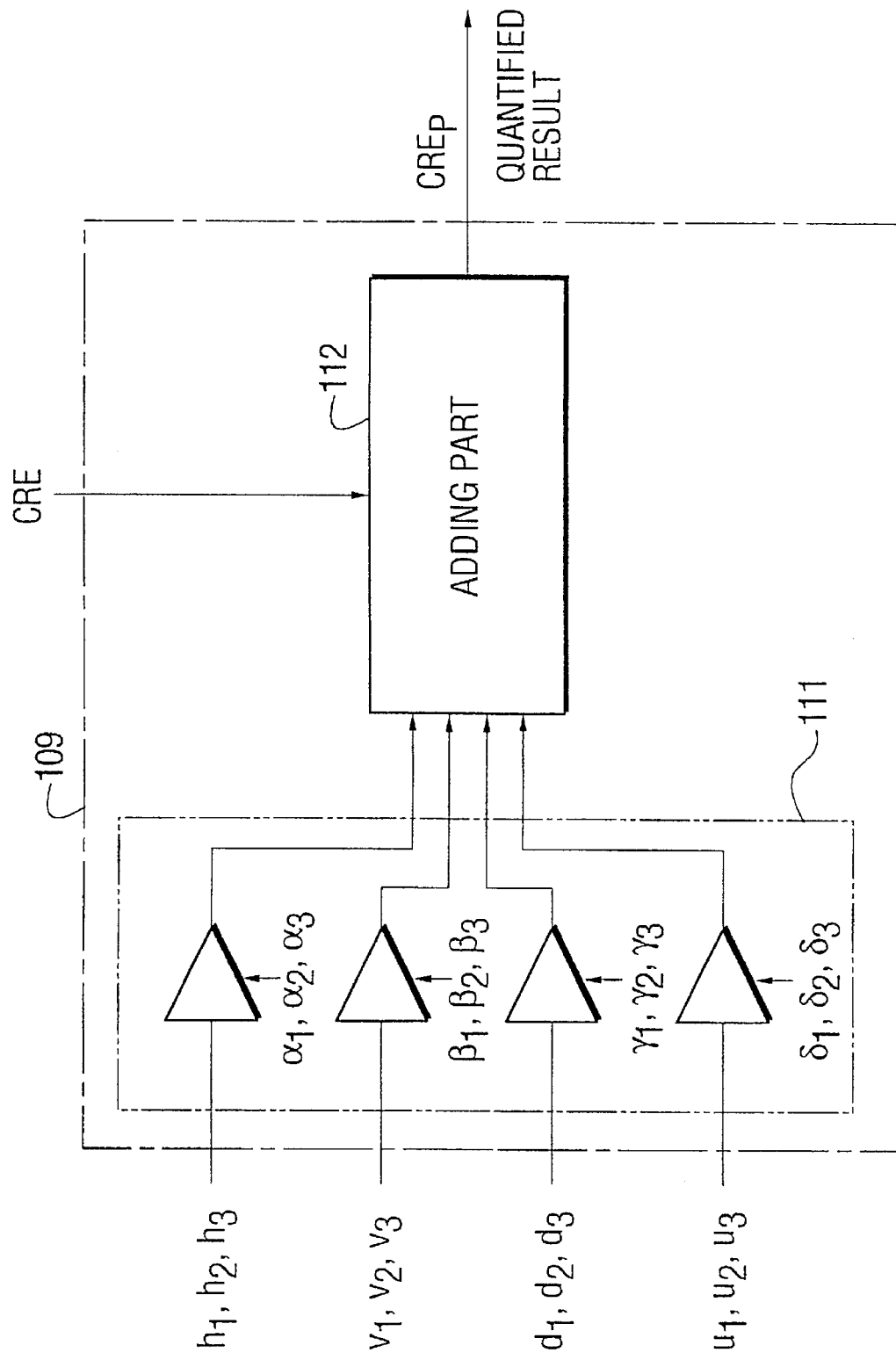

1

BASIC CELL FOR FIRING SPATIO-TEMPORAL PULSES AND PATTERN RECOGNITION UNIT USING THE SAME

This application is a continuation, of application Ser. No. 08/211,299, filed as PCT/JP93/01053 Jul. 27, 1993 and published as WO94/03870 Feb. 17, 1994, now abandoned.

TECHNICAL FIELD

The present invention relates to a basic cell for firing spatio-temporal pulses for use in detecting segments, contours, circles, squares and similar simple graphic forms and their movement in the pattern recognition of characters and graphic forms and a cellular automation-type pattern recognition unit using a two-dimensional array of such cells. More particularly, the invention pertains to a pattern recognition unit which is applicable to the quantitative estimation of reproduction errors display variations in testing CCD image sensors, liquid crystal display TFT panels and the like.

BACKGROUND ART

Conventionally, CCD image sensors are visually checked for color reproduction errors; but it is proposed in Japanese Patent Application Laid-Open Nos. 97074/91, 100768/91 and 100769/91 to estimate reproduction errors on the basis of a quantified numerical value obtained by fusing the errors detected through statistical processing thereof, and these proposed schemes are disclosed in U.S. Pat. No. 5,204,948 issued to the inventor of this application. Moreover, the inventor proposes, in his paper "Color Reproduction Test For CCD Image Sensors," Proc. 1990 International Test Conference, pp 493–497, Washington, D.C., Sep. 10–14, 1990 (Literature 1), to test CCD image sensors by numerical values obtained by fusing and quantifying various variations detected through statistical processing.

However, these conventional schemes utilize statistical techniques, and hence they rely largely on probabilistic factors; it is impossible to definitely say, "Here is a vertical stripe," or "Here is a slanted stripe." The prior art methods are unsatisfactory in this respect.

In an example of conventional pattern recognition, each pattern contained in an image is attached a name by list processing and, to detect its shape, the pattern is matched with a template pattern prestored in a memory; the pattern recognition depends on the extent of their matching.

A neural network has also been under study as another pattern recognizing scheme.

In another example of the conventional pattern recognition techniques, image processing operators such as Laplacian, Sobel and differentiation are used to detect segments and contours. An example of such an image processing operator is shown in FIG. 1. The figure is composed of 3×3=9 squares, each of which corresponds to one pixel of an image to be processed. The numerical value in each square is its weighted value. The square at the center of the figure is made to correspond to the pixel being noted, then a weighted mean between it and the surrounding pixels (the sum total of products of weighted values of the nine squares and the gradation values of the corresponding pixels) is obtained, and the thus obtained weighted mean is used as the value of the center square after oerator processing. By performing this operator processing for all pixels of the image, pixels corresponding to segments and contours have large values; hence, the segments and contours are detected clearly.

The conventional pattern recognition calls for checking all templates. This inevitably involves an enormous amount of processing and consumes much time. The prior art poses problems such as the permissible limit of mismatching between the template and the actual pattern, in addition to the above-noted problems.

The pattern recognition scheme that utilizes a neural network requires a learning time and poses another problem such as the extent to which teaching patterns are regarded as identical with each other; therefore, this technique has not been put to practice yet.

The pattern recognition scheme using the image processing operator is readily affected by noise caused by dust or stains on the image and does not necessarily allows ease in detecting a continuous segment or contour. Of course, there has not been ever proposed pattern recognition equipment capable of detecting the motion of a detected segment or contour.

A first object of the present invention is to provide a spatio-temporal pulse firing basic cell which permits accurate, high-speed pattern recognition without involving matching against a template pattern and without using an image processing operator.

A second object of the present invention is to provide pattern recognition equipment which uses the above-mentioned spatio-temporal pulse firing basic cell, withstands noise and permits easy detection of a segment or contour.

A third object of the present invention is to provide pattern recognition equipment which uses the above-mentioned spatio-temporal pulse firing basic cell and permits the detection of the motion of a segment or contour.

A fourth object of the present invention is to provide pattern recognition equipment which uses the above-mentioned spatio-temporal pulse firing basic cell and permits the detection of a line component of a pattern in the direction of its travel.

A fifth object of the present invention is to provide pattern recognition equipment which uses the above-mentioned spatio-temporal pulse firing basic cell, neither involves matching against a template pattern nor uses an image processing operator but permits accurate, high-speed pattern recognition and allows a quantitative estimation of a reproduction error in an image.

DISCLOSURE OF THE INVENTION

According to a first aspect of the present invention, the spatio-temporal pulse firing basic cell for image processing is made up of: a time input port; a plurality of space input port; a time output port; a plurality of space output ports; time data input means for inputting time input data from the time input port; space data input means for inputting space input data from the plurality of space input ports; calculating means for obtaining time output data and space output data from the time input data provided by the time data input means and the space input data provided by the space data input means; time data output means for providing the time output data by the calculating means to the time output port and for providing the time output data as the next time input data to the time input port; and space data output means for providing the space output data by the calculating means to the space output port.

In the pattern recognition equipment according to a second aspect of the present invention, a plurality of such spatio-temporal pulse firing basic cells are arranged in a two-dimensional form corresponding to pixels of an image, the plurality of space input ports of each basic cell are connected to the space output ports of the other basic cells and the plurality of space output ports of each basic cell are connected to the input ports of the other basic cells.

The pattern recognition equipment according to the third aspect of the present invention comprises: a spatio-temporal pulse generator in which a plurality of such spatio-temporal pulse firing basic cells according to the first aspect of the invention are arranged in a two-dimensional form corresponding to pixels of an image, the plurality of space input ports of each basic cell are connected to the space output ports of the other basic cells and the plurality of space output ports of each basic cell are connected to the space input ports of the other basic cells; two-dimensional shift register means which is supplied with the output from the time output port of each basic cell; and a primary operation detecting part which detects the direction of motion of pulses from their positions in respective shift stages of the two-dimensional shift register means.

According to the fourth aspect of the present invention, the pattern recognition equipment according to the third aspect further comprises: a plurality of position/direction storage two-dimensional shift register means which are provided corresponding to a plurality of predetermined directions of motion to be detected by the above-mentioned primary operation detecting part and are supplied with pulses indicating the presence of the detected direction of motion; a secondary operation detecting part which detects, as line component information, the direction of motion of pulses, from their positions in respective shift stages of the position/direction storage two-dimensional shift register means; and a plurality of line component memory means wherein the line component information detected by the secondary operation detecting part are stored at addresses corresponding to their detected positions.

According to the fifth aspect of the present invention, the pattern recognition equipment according to the fourth aspect further comprises: conversion means for converting color image data to hue image data, saturation image data and lightness image data; color select means which generates binary hue data for each hue, the pixel position where the saturation image data is above a predetermined value being made a "1" and the pixel position where the saturation image data is below the predetermined value being made a "0", the binary hue data being provided to the space input port of the spatio-temporal pulse generator; means which refers to the saturation image data corresponding to the pixel positions of the line component detected by the secondary operation detecting part and converts the line component into numerical form; quantify means for obtaining a color reproduction error quantified from the hue image data, the saturation image data and the lightness image data through utilization of their statistical properties; and fusion means which fuses the quantified color reproduction error and the line component in numerical form for output as a finally quantified color reproduction error.

BRIEF DESCRIPTION OF THE DRAWINGS

FIG. 5 is a diagram basic cells arranged in a matrix form and reference characters assigned to them.

FIG. 17 is a block diagram showing its part.

BEST MODE FOR CARRYING OUT THE INVENTION

Figures 1, 2:
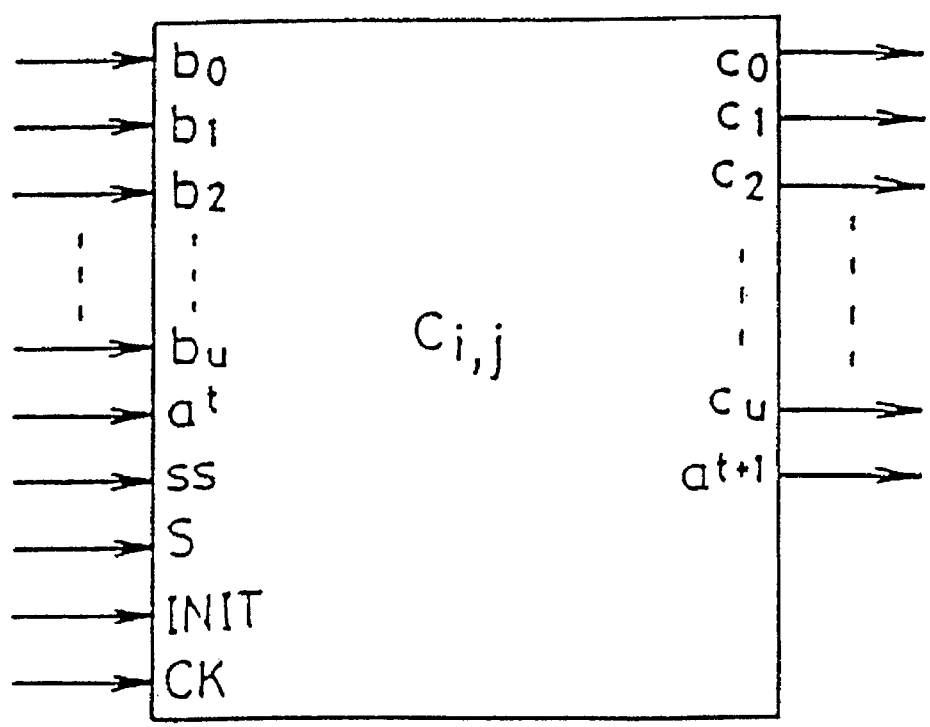
FIG. 1 is a diagram showing an operator (a weighting function) for use in conventional image processing technique.
FIG. 2 is a block diagram showing input/output signals of the spatio-temporal pulse firing basic cell according to the first aspect of the present invention.

FIG. 2 shows input and output signals (terminals) of the spatio-temporal pulse firing basic cell $C_{i,j}$ according to the present invention. In FIG. 2, the suffixes i, j represents an i-row, j-column basic cell in a basic cell matrix and reference characters representing the respective terminals of the basic cell indicate signals or data which are input into or output from the terminals. In the interests of simplicity and clarity, the suffixes i, j will not be added unless required (although they are supposed to be added). The basic cells are all identical in construction.

Reference characters $b_0, b_1, \ldots, b_u$ denote space input ports and $c_0, c_1, \ldots, c_u$ space output ports; hence, the numbers of space input ports and space output ports are (u+1), respectively. Reference character $a^t$ denotes a time input port and $a^{t+1}$ a time output port. Reference character S denotes a threshold value input port, as a threshold setting terminal, INIT an initial value setting terminal and clock CK a synchronizing clock input terminal. For the sake of brevity, the same reference characters will be used in common to input/output ports and data which are input thereinto and output therefrom, unless otherwise specified. Let it be assumed that data is input at time t and output at time t+1.

The calculations which are performed in the basic cell are defined as follows:

$$a^{t+1} = \begin{array}{ll} Pa, & \text{if } \Sigma b_k \geq S \text{ and } a^t = Pd, \text{ or} \\ & \Sigma b_k < S \text{ and } a^t = Pa, \\ Pd, & \text{if } \Sigma b_k \geq S \text{ and } a^t = Pa, \text{ or} \\ & \Sigma b_k < S \text{ and } a^t = Pd. \end{array} \quad (1)$$

$$c_k = \begin{array}{ll} q_e, & \text{if } b_k = q_i \text{ and } a^t = Pa, \text{ or} \\ & b_k = q_e \text{ and } a^t = Pd, \\ q_i, & \text{if } b_k = q_e \text{ and } a^t = Pa, \text{ or} \\ & b_k = q_i \text{ and } a^t = Pd. \end{array} \quad (2)$$

Here, $Pa$, $Pd$, $q_e$ and $q_i$ are binary constants; for example, they are set to $Pa=1$, $Pd=0$, $q_e=0$ and $q_i=1$. S indicates a threshold value, which is a predetermined integer equal to or greater than 1. $\Sigma b_k$ (where $k=0, 1, 2, \ldots, u$) represents the number of those of space input data $b_0$ through $b_u$ which have logic 1. Defining a threshold logical valuable L as follows:

if $\Sigma b_k \geq S$, $L=1$ if $\Sigma b_k < S$, $L=0$, and rewriting Eqs. (1) and (2) with $Pa=1$, $Pd=0$, $q_e=0$ and $q_i=1$, they becomes the following equations (3) and (4), respectively.

$$a^{t+1} = L \;(+)\; a^t \quad (3)$$

$$c_k = b_k \;(+)\; a^t \quad (4)$$

where (+) is a logical symbol which means exclusive ORing.

Eqs. (3) and (4) could be explained in words as follows: The time output data $a^{t+1}$ is the exclusive OR of the time input data $a^t$ and the threshold logical variable L, and the space output data $c_k$ is the exclusive OR of the space input data $b_k$ and the time input data $a^t$.

Figure 3A:
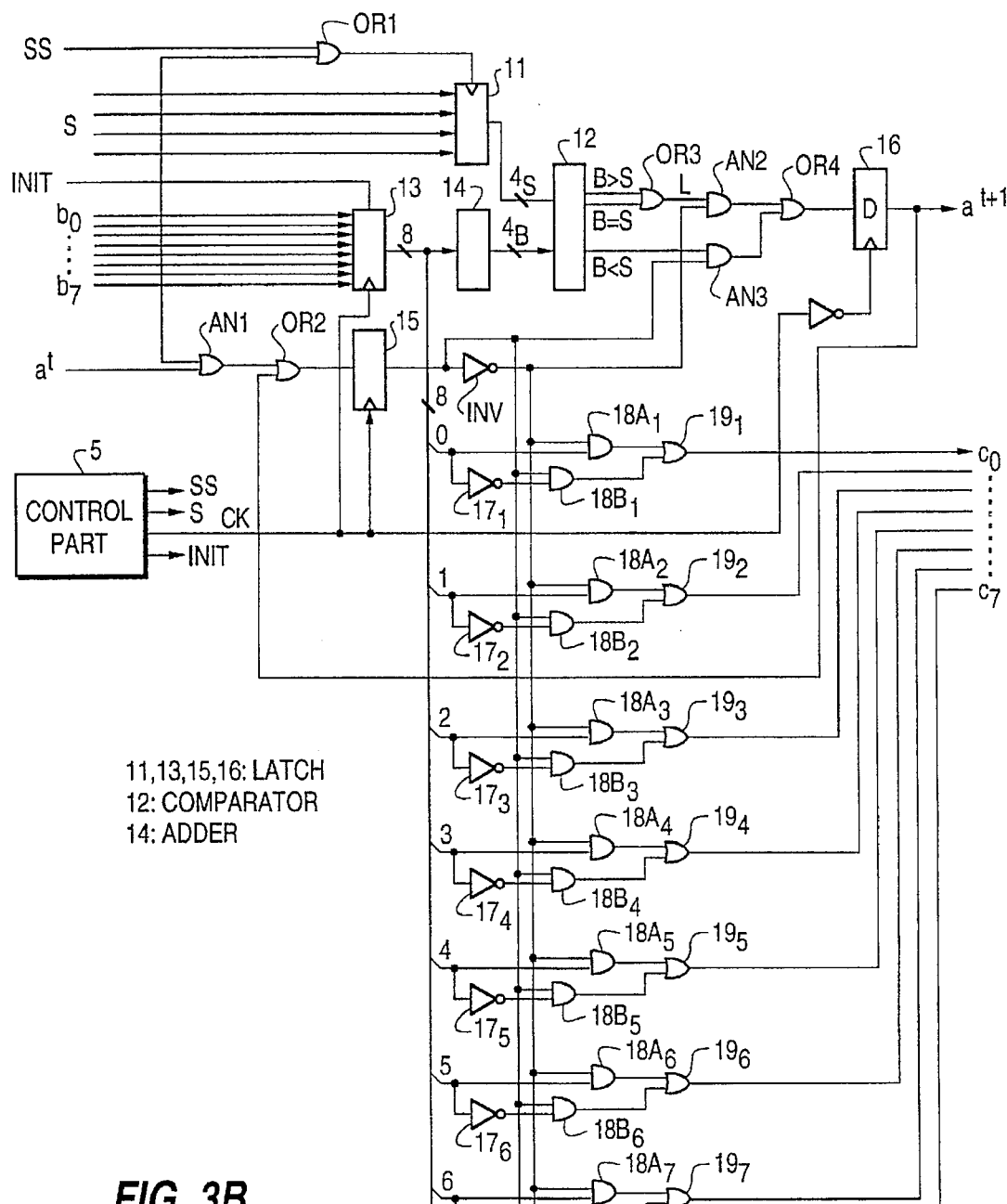
FIG. 3A is a functional block diagram of the spatio-temporal pulse firing basic cell.

FIG. 3A illustrates a concrete circuit example of the spatio-temporal pulse firing basic cell, in which the numbers (u+1) of input and output ports in FIG. 2 are 8. Each port is composed of one bit. An initial value setting signal INIT and a threshold value setting signal as from a control part 5 are ORed by an OR gate OR1, and when at least one of the signals INIT and as goes to logic 1, a latch signal of logic 1 is fed to a latch 11. The latch 11 is being supplied with a four-bit value, as the threshold value S, from the control part 5, and the threshold value S is latched in the latch 11 at the timing when the output of the OR gate OR1 goes to logic 1. The four-bit output S from the latch 11 is fed to the one four-bit input terminal of a comparator 12.

Eight pieces of space input data $b_0$ through $b_7$ (each one-bit) are being supplied to data input terminals of a latch 13 and are latched therein in synchronization with the rise of the clock signal CK from the control part 5. The clock signal CK is a 0101 . . . repeat signal with a period of unit time. When the initial value setting signal INIT which is applied to the latch 13 is logic 1, eight bit outputs from the latch 13 are all logic 1. The output from the latch 13 is fed to an adder 14, which obtains the sum total $\Sigma b_k$ of those of the eight bits which are logic 1, and it is fed as a four-bit output B to the other four-bit input terminal of the comparator 12.

Since the time input data $a^t$ is being input into an AND gate AN1 together with the initial value setting signal INIT, the time input data $a^t$ is allowed to pass through the AND gate AN1 for input into an OR gate OR2 only when the signal INIT is logic 1. The output from the OR gate OR2 is applied to a data input terminal of a latch 15 and latched therein in synchronization with the rise of the clock CK. In short, only when the signal INIT is logic 1, the time input data $a^t$ is latched in the latch 15. When the signal INIT is logic 0, the time input data $a^t$ is not latched, but instead time output data $a^{t+1}$, which is provided at the output of a latch 16 described later, is latched in the latch 15 via the OR gate OR2. That is, when the signal INIT is logic 0, the time input data for use in the basic cell is not the data input from the time input port $a^t$ but data output from the time output port $a^{t+1}$ one unit time before. This can be understood from the fact that the latch 15 and a latch 16 perform the latching operation at the rise of the same clock signal CK. In the case where such basic cells are arranged in a matrix form for image processing or pattern recognition, pixel data of an image is provided as an initial value of the time input data $a^t$ of the corresponding basic cell and the time output data $a^{t+1}$ processed by each basic cell is output as image-processed data.

In the comparator 12 the four-bit threshold value S input to its input terminal S and the four-bit added value fed to its input terminal B are compared. When the input B is larger than the input S, logic 1 is provided at an output terminal (B>S) alone; when the input B and the input S are equal, logic 1 is provided at an output terminal (B=S) alone; and when the input B is smaller than the input S, logic 1 is provided at an output terminal (B<S) alone. The B>S output and B=S outputs from the comparator 12 are ORed by an OR gate OR3, whose output is applied to the one input terminal of an AND gate AN2 to control it. On the other hand, the B<S output from the comparator 12 is fed to the one input terminal of an AND gate AN3 to control it. Thus, the control signals which are applied to the AND gates AN2 and AN3 are opposite in logic. An OR gate OR4 is supplied with the outputs from the AND gates AN2 and AN3 and outputs their OR. The set of AND gates AN2, AN3 and OR gate OR4 is called an AND-OR gate and is used to selectively output either one of the pieces of data input into the other input terminals of the AND gates AN2 and AN3 by the control input signals of opposite logical values which are fed to the above-said one input terminals.

To the other input terminal of the AND gate AN2 the time input data $a^r$ provided at the output of the latch 15 is being applied after being inverted by an inverter INV, and to the other input terminal of the AND gate AN3 the time input data $a^r$ obtained at the output of the latch is applied intact. Consequently, when the data input into the comparator 12 is B≧S, the inverted value of the time input data $a^r$ is provided at the output of the OR gate OR4, and when the data is B<S, the time input data $a^r$ is provided at the output of the OR gate OR4. The output from the OR gate OR4 is fed to a data input terminal D of the latch 16 and is latched therein by the rise of the clock signal CK and output therefrom as the time output data $a^{r+1}$. In this way, Eq. (3) is implemented. As referred to previously, the output from the OR gate OR3 and the B S output from the comparator 12 are always opposite in logic to each other, besides the data which are provided to the other input terminals of the AND gates AN2 and AN3 are also opposite in logic to each other; the circuit made up of the inverter INV, the AND gates AN2 and AN3 and the OR gate OR4 and supplied with the outputs from the OR gate OR3 and the latch 15 can be expressed equivalently as shown in FIG. 3A, and a circuit XOR in FIG. 3A forms an exclusive OR circuit. That is, the circuit XOR is one that EXCLUSIVE ORs the threshold logical variable L (Eq. (3)) provided at the output of the OR gate OR3 and the time input data $a^r$ provided at the output of the latch 15.

An inverter circuit 17 composed of inverters $17_1$ through $17_8$, an AND circuit 18A composed of AND gates $18A_1$ through $18A_8$, an AND circuit 18B composed of AND gates $18B_1$ through $18B_8$ and an OR circuit 19 composed of OR gates $19_1$ through $19_8$ constitute eight data selector circuits by the respective circuit elements of the corresponding suffixes. Since the eight pieces of space input data $b_0$ through $b_7$ from the latch 13 are input into the eight data selector circuits, respectively, and are subjected to the same processing, processing of the space input data $b_0$ will be described below.

The space input data $b_0$ available at the output terminal of the latch 13 is inverted by the inverter $17_1$ and is fed as data to the one input terminal (a data terminal) of the AND gate $18B_1$. The AND gate $18A_1$ is supplied at its data input terminal with the space input data $b_0$ intact. On the other hand, the AND gate $18A_1$ is supplied at the other input terminal (a control input terminal) with an inverted version of the time input data $a^r$ and the AND gate $18B_1$ is supplied at the other input terminal (a control input terminal) with the time input data $a^r$ intact. Consequently, when the time input data $a^r$ is logic 0, the non-inverted space input data $b_0$ is selected by the AND gate $18A_1$, and when the time input data $a^r$ is logic 1, the inverted space input data $b_0$ is selected by the AND gate $18B_1$. Since the outputs from the AND gate $18A_1$ and $18B_1$ are being input into the OR gate $19_1$, the space input data selected by either one of the AND gates $18A_1$ and $18B_1$ is output as space output data $c_0$ at the output of the OR gate $19_1$. To sum up, when the time input data $a^r$ is logic 0, the space input data $b_0$ is output intact (non-inverted) as the space output data $c_0$, and when the time input data $a^r$ is logic 1, the inverted version of the space input data $b_0$ is output. That is, the calculation of Eq. (4) is conducted.

In other words, the inverter INV, the inverter $17_1$, the AND gate $18A_1$, the AND gate $18B_1$ and the OR gate $19_1$ constitute an exclusive OR circuit.

While in the above the time input data $a^r$ is handled as a control signal and the space input data $b_0$ as data to be controlled, but since their functions are interchangeable in the exclusive OR circuit, the following could also be said of them. That is, when the space input data $b_0$ is logic 0, the time input data $a^r$ is output intact (in the non-inverted form) as the space output data $c_0$, and when the space input data $b_0$ is logic 1, the inverted version of the time input data $a^r$ is output. In other words, the calculation of Eq. (4) is conducted. Also for the other space input data $b_1$ through $b_7$ which are output from the latch 13, the calculation of Eq. (4) is similarly performed by the inverter INV and the corresponding data selectors (each formed by the corresponding ones of the inverter circuits $17_2$ through $17_7$, the AND circuits $18A_2$ through $18A_7$ and $18B_2$ through $18B_8$ and OR circuits $19_2$ through $19_7$), providing space outputs $c_1$ through $c_7$.

Figure 3B:
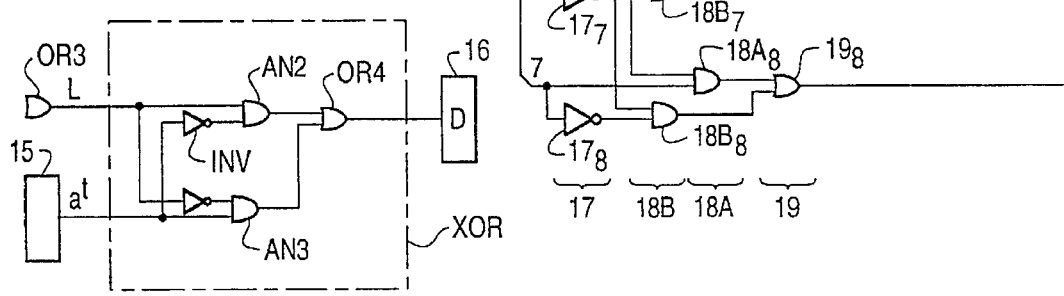
FIG. 3b is a diagram of an XOR circuit formed in FIG. 3A.

The above embodiment of the spatio-temporal pulse firing basic cell according to the first aspect of the present invention is comprised of the input/output terminal configuration and the logical circuits shown in FIGS. 2, 3A and 3B. In FIG. 3A the time input port is the terminal $a^r$, and the time input data $a^r$ is captured into the basic cell through a time data input circuit made up of the initialization signal terminal INIT, the AND gate AN1, the OR gate OR2, the clock signal terminal CK and the latch 15. The plurality of space input ports are the terminals $b_0$ through $b_7$, and the space input data $b_0$ through $b_7$ are captured into the basic cell through a space data input circuit made up of the initialization signal terminal INIT, the clock signal terminal CK and the latch 13. A calculation circuit, which is made up of the latch 11, the adder 14, the comparator 12, the inverter INV, the OR gate OR3, the AND gates AN2 and AN3 and the OR gate OR4, uses the time input data $a^r$ and the space input data $b_0$ through $b_7$ to calculate the time output data $a^{r+1}$ defined by Eq. (3) and the calculated output is latched in the latch 16. The time output data $a^r$ is output at the time output port $a^{r+1}$ through a time data output circuit made up of the latch 16 and the clock signal terminal CK. A calculation circuit, which is made up of the inverter INV, the inverter circuit 17, the AND circuits 18A and 18B and the OR circuit 19, uses the time input data $a^r$ and the space input data $b_0$ through $b_7$ to calculate the space output data $c_0$ through $c_7$ defined by Eq. (4). The space output data $c_0$ through $c_7$ are output to the space output ports $c_0$ through $c_7$ through a space data output circuit formed by the OR circuit 19. As described above, there are provided the time input/output ports, the space input/output ports and the calculation circuits which obtain the time output data and the space output data through utilization of the time input data and the space input data; hence, when the calculation circuits, that is, such transition functions as defined by Eqs. (3) and (4) are selected, the feature amount of the image to be extracted is determined and the relationship between the spatio-temporal input and output data is determined accordingly.

Figure 4A:
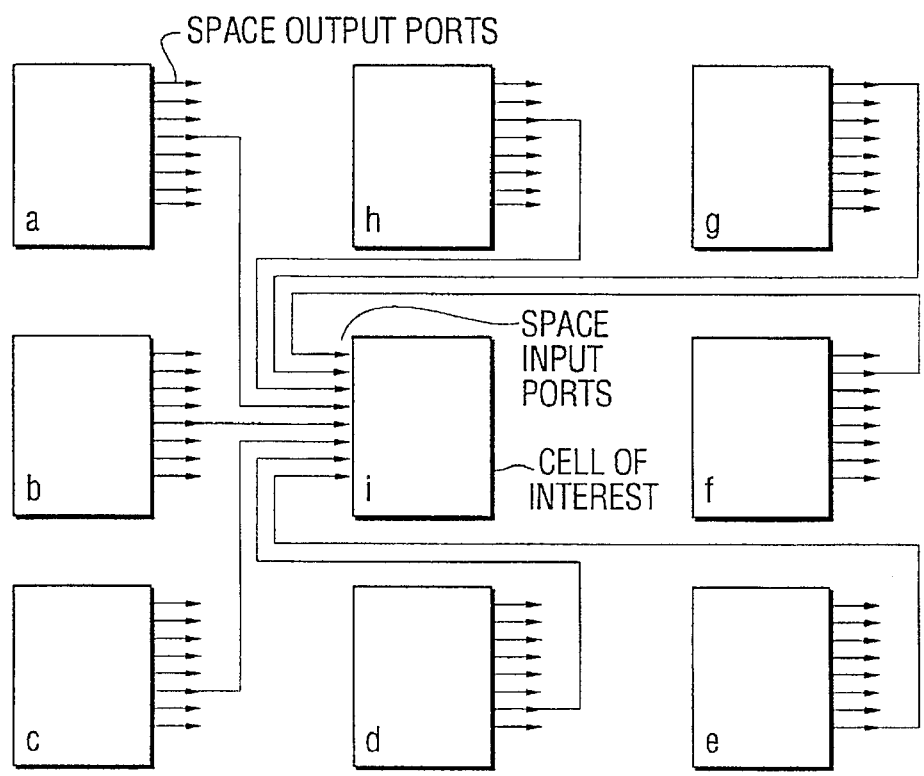
FIG. 4A is a diagram showing the connection of the space input ports of an arbitrary basic cell to the space output ports of the other basic cells in a basic cell matrix array forming the pattern recognition equipment according to the second aspect of the present invention.
Figure 4B:
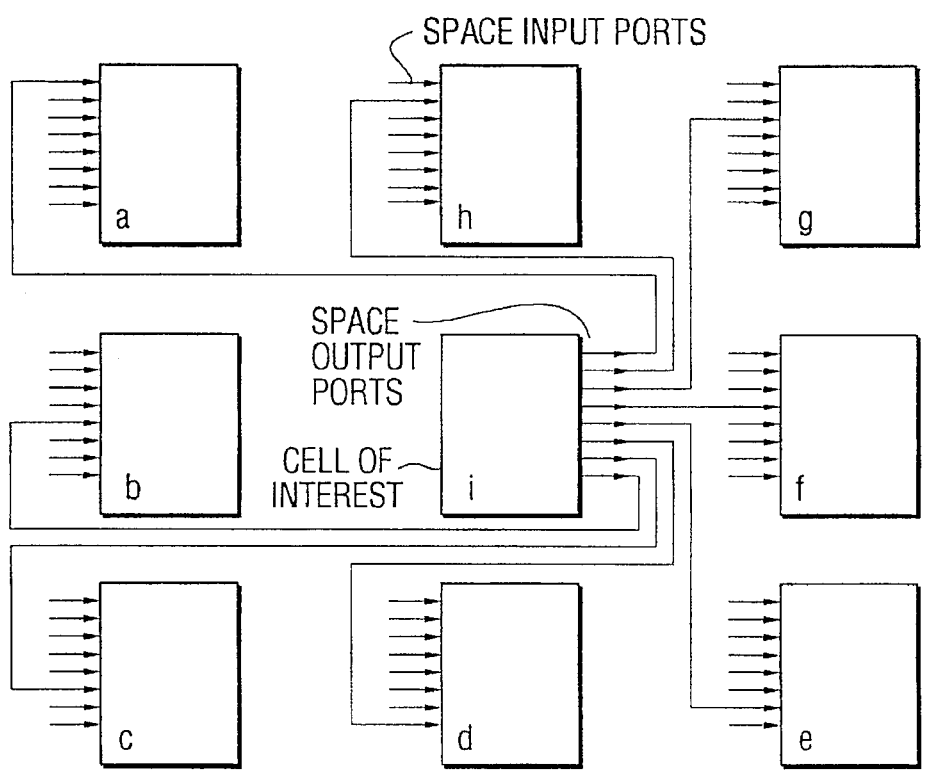
FIG. 4B is a diagram showing the connection of the space output ports of the arbitrary basic cell to the space input ports of the other basic cells.

According to the second aspect of the present invention, a plurality of spatio-temporal pulse firing basic cells of the embodiment according to the first aspect are arranged in two dimensions corresponding to unit pixels to form cellular automation-type pattern recognition equipment. The space input ports of each cell are connected to the space output ports of desired ones of the other basic cells and the space output ports of the said each basic cell are connected to the space input ports of the desired ones of the other basic cells. In FIGS. 4A and 4B there are shown the connection of input ports of an arbitrary basic cell and output ports of the other cells in a matrix array and the connection of output ports of the said arbitrary cell and input ports of the other cells, respectively.

FIGS. 4A and 4B illustrate an example of the basic connection of the input and output ports of 3 by 3 adjoining basic cells at arbitrary positions in a matrix array of many basic cells. As depicted in FIG. 4A, 3 by 3 basic cells a through i are arranged in a matrix form and the basic cells (a through i) each correspond to one of pixels forming an image. Now, consider the basic cell i at the center of the matrix array of the basic cells a through i. The center basic cell i is provided with eight space input ports, which are each connected to one of space output ports of each of the adjoining basic cells a through h. FIG. 4B shows the same basic cells as those depicted in FIG. 4A, and eight space output ports of the center basic cell i are each connected to one of space input ports of each of the adjoining basic cells a through h. In FIGS. 4A and 4B, the center basic cell i has its space input and output ports connected in pairs to all of the adjoining basic cells a through h. The space input/output port connections described above are isotropic. That is, when considering an arbitrary basic cell as the above-noted center basic cell in the two-dimensional matrix array of the basic cells, it is surrounded by a total of eight adjoining basic cells, except those in the peripheral portion of the matrix array, and the state of space input/output port connections between the center basic cells and the adjoining cells remain unchanged, no matter which basic cell may be considered as the center one. Though not shown, each basic cell is supplied at its time data input port $a^t$ with the corresponding pixel data of the image to be processed and the pixel data processed by the basic cell is output as the time output data $a^{t+1}$. The clock CK, the initialization signal INIT, the threshold value S and the setting signal ss are fed from a common control part (i.e. the control part 5 in FIG. 5) to all basic cells. Since a plurality of spatio-temporal pulse firing basic cells are provided and have their space input and output ports interconnected as described above, the propagation path in space of pulses that are fired by each basic cell (which pulses will hereinafter referred to as fired pulses) as described later on. The two-dimensional array of basic cells will be called a spatio-temporal pulse generator.

In an embodiment of the spatio-temporal pulse generator shown in FIGS. 3A, 3B, 4A and 4B, when the latch 13 is forcefully preset to logic 1 under the control of the initialization signal INIT, an eight-bit signal of logic 1 is provided as the space input data $b_0$ through $b_7$ at the output of the latch 13—this is equivalent to that these eight pieces of space input data $b_0$ through $b_7$ are once initialized to logic 1 and then input. The time input data (pixel data) $a^t$ is once input as an initial value through the AND gate AN1 and the OR gate OR2 under the control of the initialization signal INIT and then it is latched in the latch 15 in synchronization with the rise of the clock CK. The above is the initializing operation, after which the signal INIT is made inactive; so that thereafter the space input data $b_0$ through $b_7$ are each latched in the latch 15 in synchronization with the rise of the clock CK.

When the signal goes inactive (logic 0), the AND gate AN1 is disabled; so that after the timing of the next clock the time output data $a^{t+1}$ available at the output of the latch 16 is latched in the latch 15 via the OR gate OR2 at the rise of the clock CK and is used again as the time input data $a^t$ (processed pixel data) after the elapse of the unit time. Thereafter, the processing operations of the time data input circuit formed by the terminal INIT, the time input terminal $a^t$, the AND gate AN1 and the OR gate OR2 (only the OR gate OR2 going active after initialization), the space data input circuit formed by the terminal INIT, the space input ports $b_0$ through $b_7$, the latch 13 and the clock CK input terminal, the time data output circuit formed by the latch 16, and the space data output circuit formed by the OR circuit 19 are repeated every unit time in synchronization with the clock CK under the control of the control part 5. In the image processing step wherein the time output data (image data) $a^{t+1}$ is further repeatedly input as the time input data $a^t$ as mentioned above, it is possible to extract the feature amount of image pulse firing.

Figure 5:
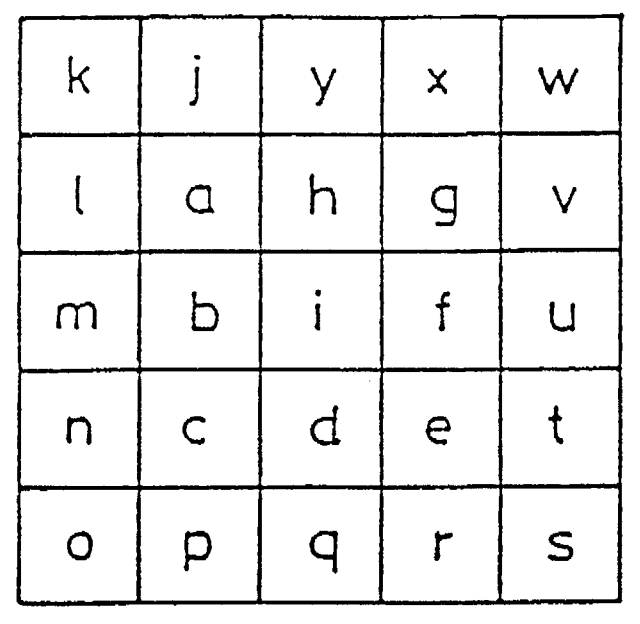

In the above-mentioned embodiment of the spatio-temporal pulse generator for image processing use, the space input and output ports of each basic cell are connected to a plurality of basic cells which are, for example, equal in the cell distance from the said each basic cell. The cell distance is the shortest distance between adjacent basic cells when the distance between them is set to 1. For instance, FIG. 5 shows 5×5=25 basic cells at arbitrary positions in a matrix array of many basic cells; in this case, the cell distance between the basic cell i and each of the basic cells a through h is 1 and the cell distance between the basic cell i and each of the basic cells j through y are 2. This allows the extraction of segments and contours.

Now, a description will be given some examples of the space input and output ports. As referred to previously, FIGS. 4A and 4B show an example in which 3×3=9 basic cells are arranged in a matrix form and the space input and output ports of the basic cell i at the center of the matrix are connected to the eight basic cells a through h which bear the 1-cell distance relationship to the basic cell i.

Figure 6A:
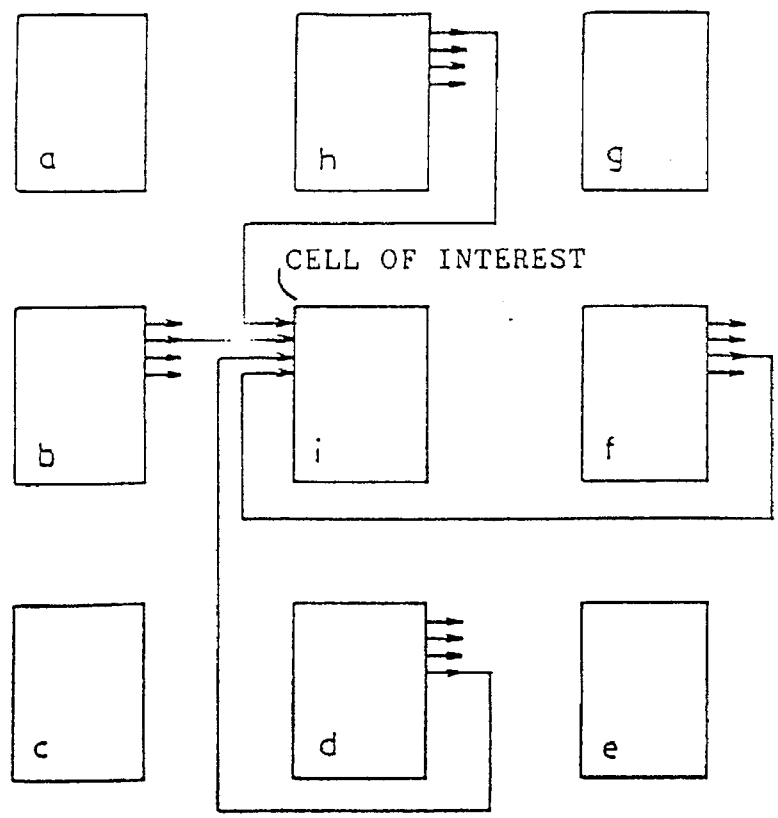
FIG. 6A is a diagram showing the connection of the space input ports of the arbitrary basic cell to the space output ports of other cells spaced therefrom a cell distance of 1.
Figure 6B:
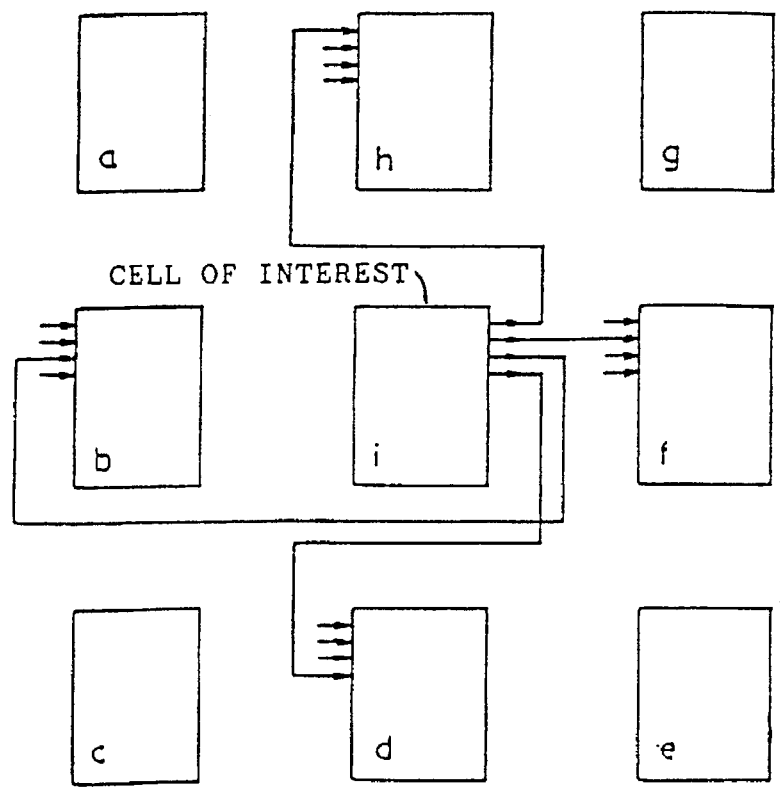
FIG. 6B is a diagram showing the connection of the space output ports of the arbitrary basic cell to the space input ports of other basic cells spaced therefrom the 1-cell distance.

FIGS. 6A and 6B show an example of the space input/output port connections between the basic cell i at an arbitrary position in the matrix array of the basic connection and four basic cells b, d, f and h surrounding the cell i and each spaced therefrom the 1-cell distance. With this configuration, it is possible to detect vertical and horizontal lines in an image.

Figure 7A:
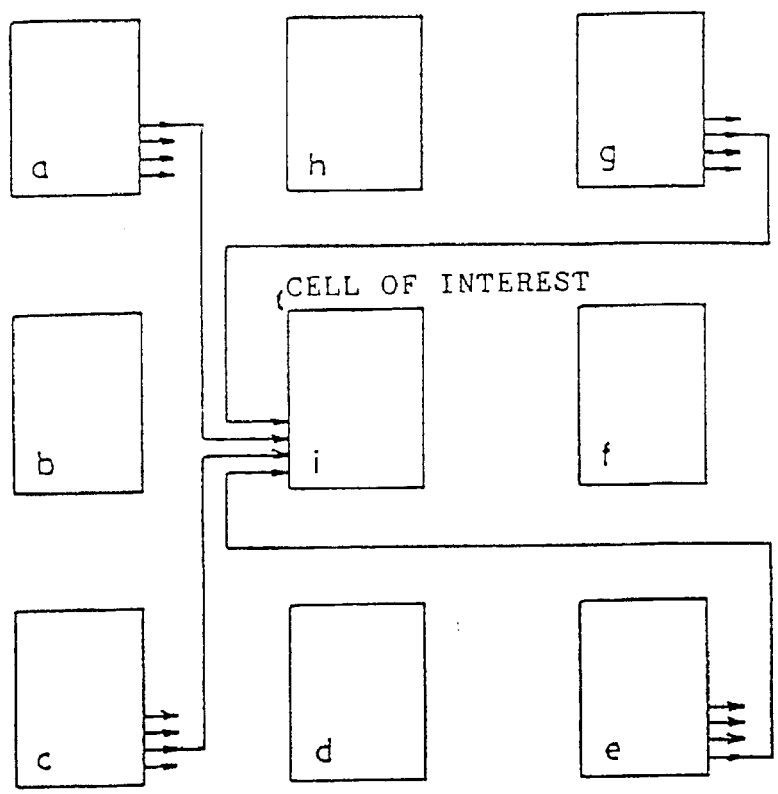
FIG. 7A is a diagram showing the connection of the space input ports of the arbitrary basic cell to the space output ports of other basic cells spaced therefrom the 1-cell distance.
Figure 7B:
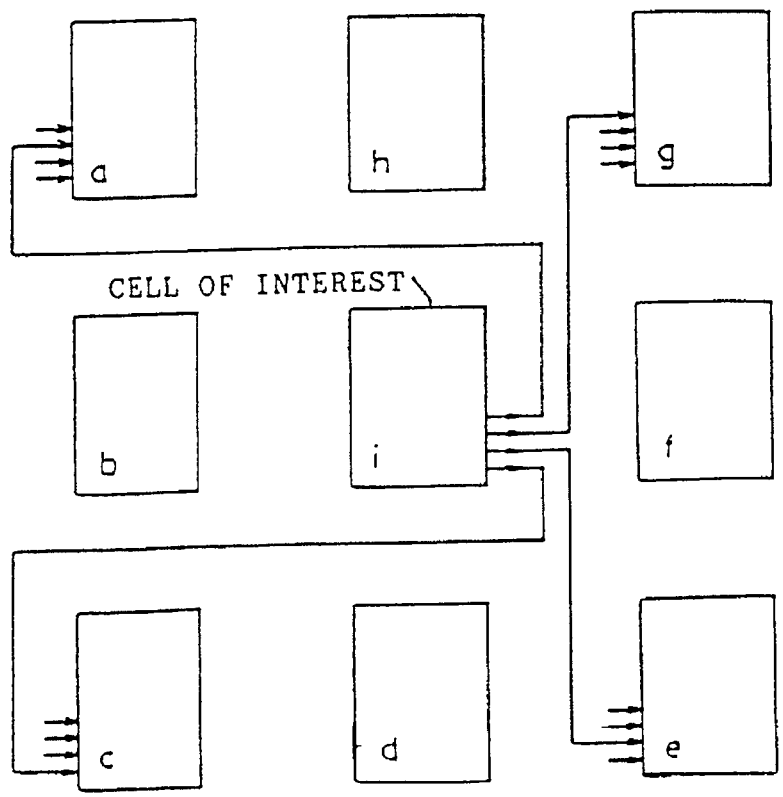
FIG. 7B is a diagram showing the connection of the space output ports of the arbitrary basic cell and the space input ports of other basic cells spaced therefrom the 1-cell distance.

FIGS. 7A and 7B show an example of the space input/output port connections between the basic cell i at an arbitrary position in the matrix array of the basic connection and four basic cells a, c, e and g diagonally opposite the basic cell i and spaced therefrom the 1-cell distance. This configuration permits the detection of slanted lines in an image.

Figure 8A:
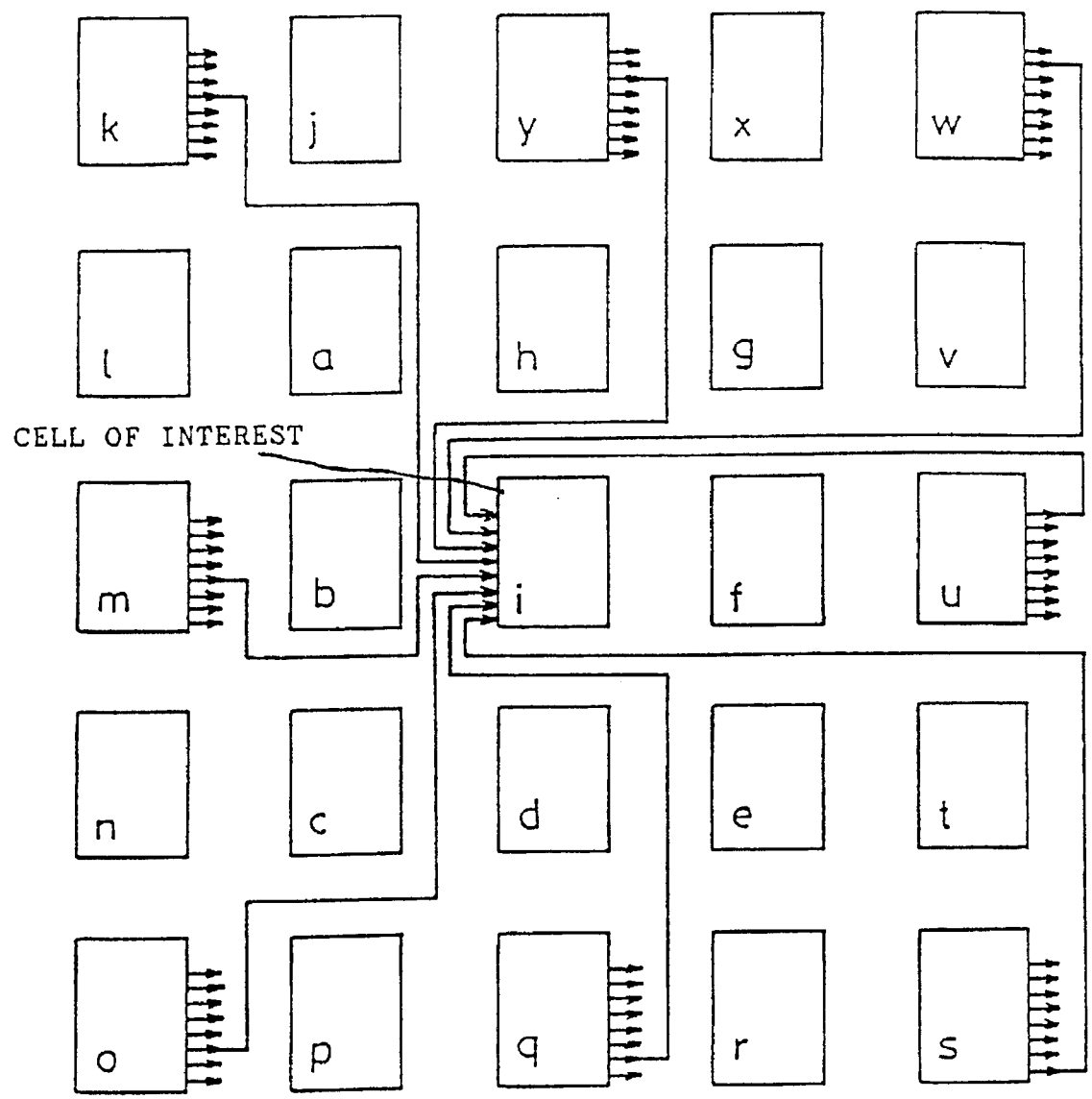
FIG. 8A is a diagram showing the connection of the space input ports of the arbitrary basic cell to the space output ports of other basic cells spaced therefrom a cell distance of 2.
Figure 8B:
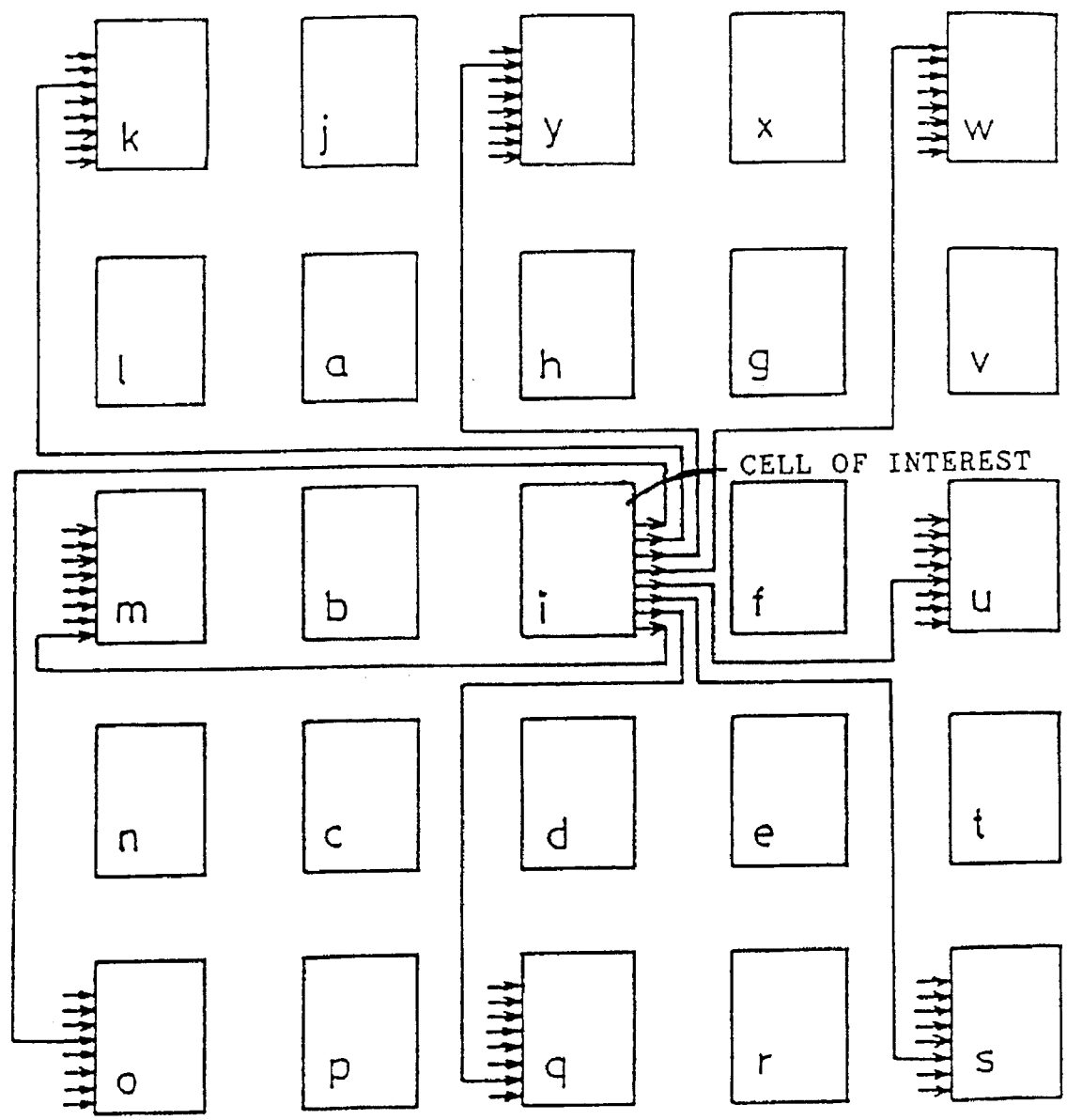
FIG. 8B is a diagram showing the connection of the space output ports of the arbitrary basic cell to the space input ports of other basic cells spaced therefrom the 2-cell distance.

FIGS. 8A and 8B show an example of the space input/output port connections between the basic cell i at an arbitrary position in the matrix array of the basic connection and those eight ones m, u, y, q, k, s, w and o of 5×5=25 basic cells surrounding the basic one i which are spaced therefrom the 2-cell distance and disposed laterally, vertically and diagonally opposite the basic cell i. This configuration permits the detection of vertical, horizontal and slanted lines in an image.

Figure 9:
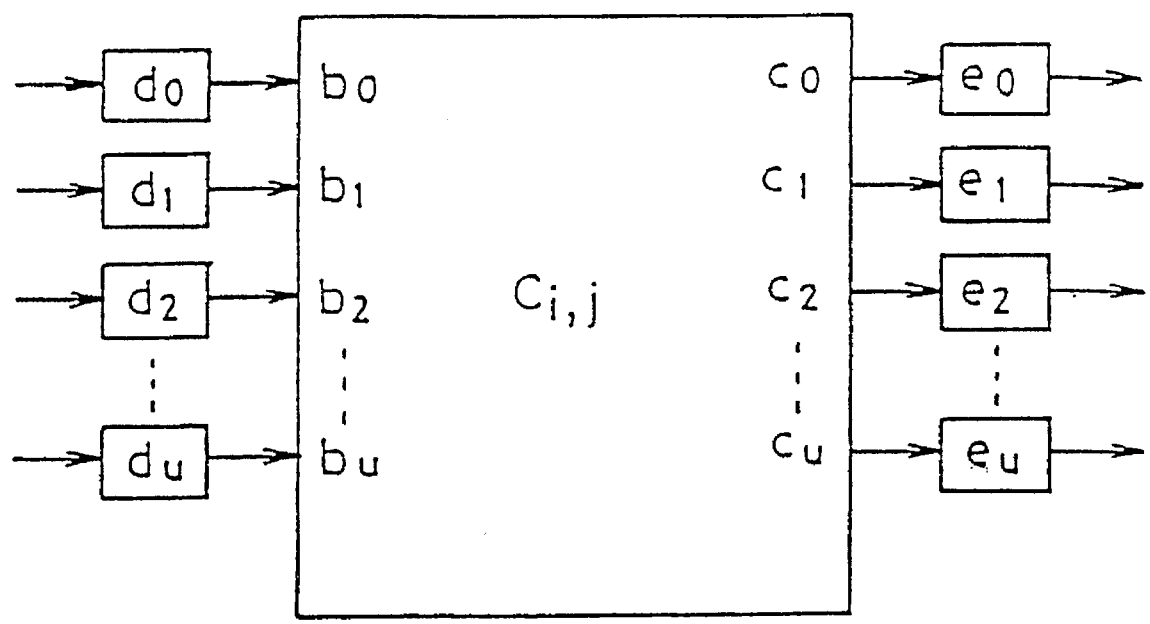
FIG. 9 is a diagram showing delay circuits provided at the space input ports and space output ports of the basic cell.

In the above-described embodiments of various basic cell matrix arrays, space input data delay circuits may be provided at the space input ports of each basic cell as shown in FIG. 9; alternatively, space output data delay circuits may be provided at the space output ports. Reference character $C_{i,j}$ denotes the basic cell; only its space input ports $b_0$ through $b_7$ and space outputs $c_0$ through $c_7$ are shown. At each space input port $b_k$ (where k=0, 1, 2, . . . , u) there is provided a $d_k$ (where $d_k$=0, 1, 2, . . . ) unit time delay circuit $d_k$. Alternatively, an $e_k$ (where $e_k$=0, 12, . . . ) unit time delay circuit $e_k$ is provided at each space output port $c_k$ (where k=0, 1, 2, . . . ). This makes it possible to extract discontinuous segments and discontinuous contours.

In the spatio-temporal pulse generator configured as described above, the generation and movement of pulses (a change from logic 0 to logic 1) are observed by oversing, in time and space, the data that is provided at the time output port $a^{t+1}$ of each basic cell. Since the generation and movement of pulses reflect features (a segmental element, a contour) of the image currently handled, the spatio-temporal pulse generator can be utilized in an image processor and pattern image recognition equipment.

For instance, when the image contains a segment or contour, the frequency of pulse firing increases along the segment or contour. In the case of an empty circle, firing pulses generated in the circumferential portion of the circle propagate toward the center thereof with the lapse of time, but in a filled circle, firing of pulses centers at the contour portion and stays there. Hence, the features of images can be extracted by observing the generation and movement of firing pulses.

Figure 10A:
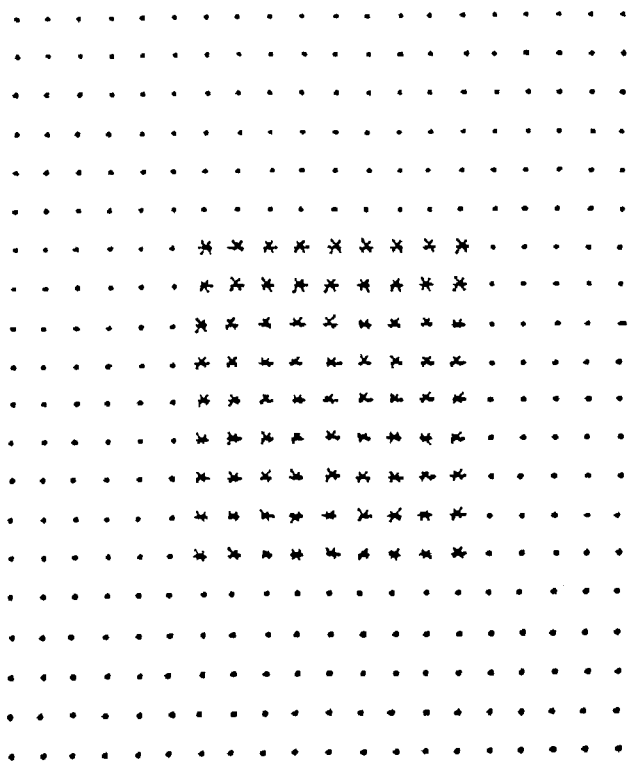
FIG. 10A is a diagram showing the initial state (time t=0) of time output data of basic cells arranged in a matrix form.
Figure 10B:
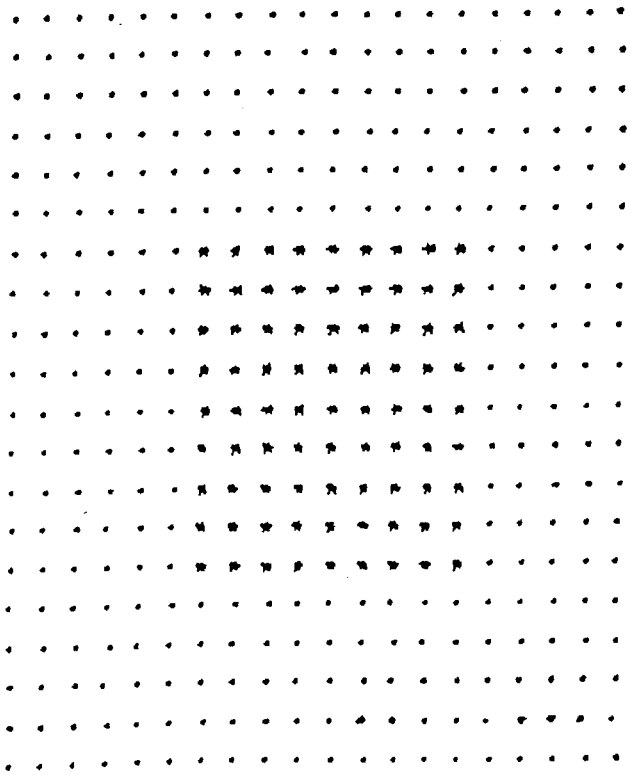
FIG. 10B is a diagram showing the state of the time output data of the basic cells arranged in the matrix form at time t=1.
Figure 10C:
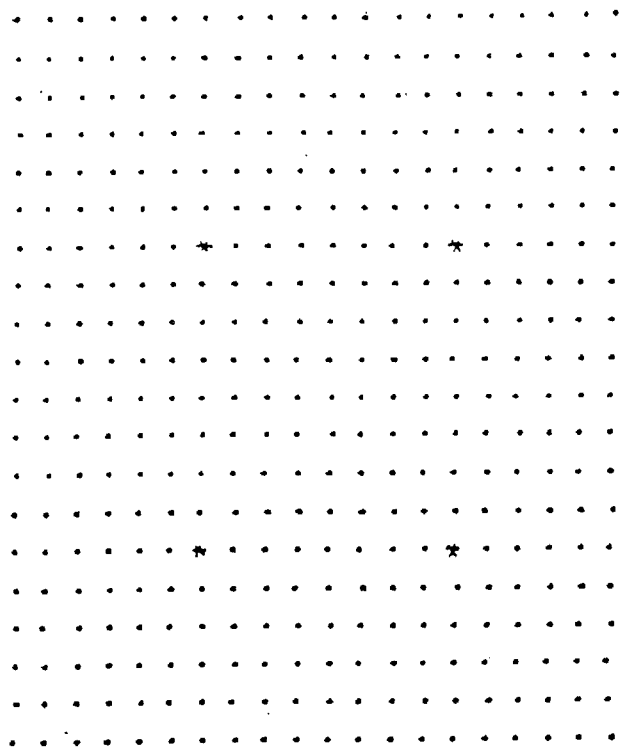
FIG. 10C is a diagram showing the state of the time output data of the basic cells arranged in the matrix form at time t=2.
Figure 10D:
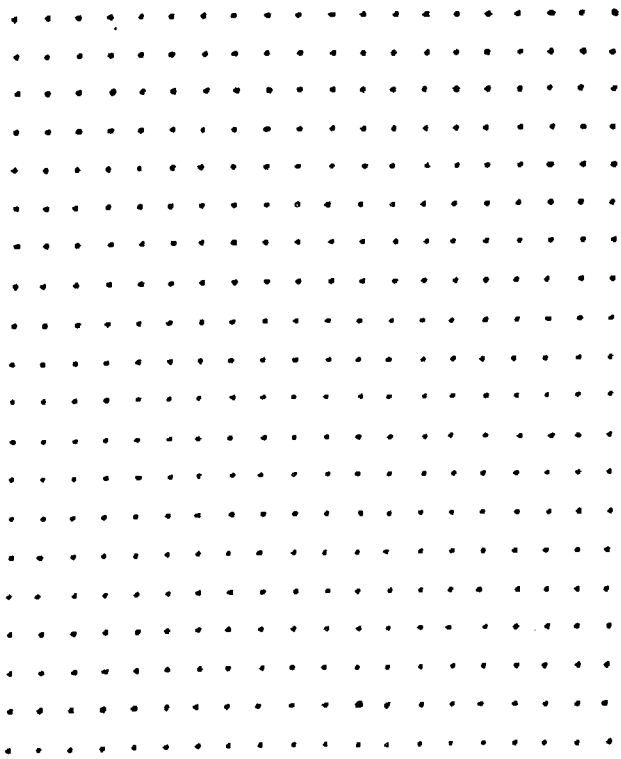
FIG. 10D is a diagram showing the state of the time output data of the basic cells arranged in the matrix form at time t=3.
Figure 10E:
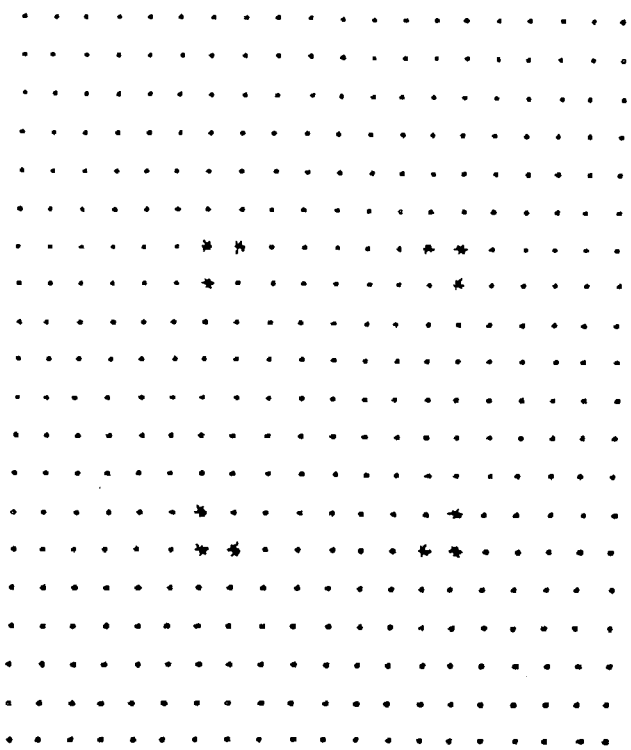
FIG. 10E is a diagram showing the state of the time output data of the basic cells arranged in the matrix form at time t=4.
Figure 10F:
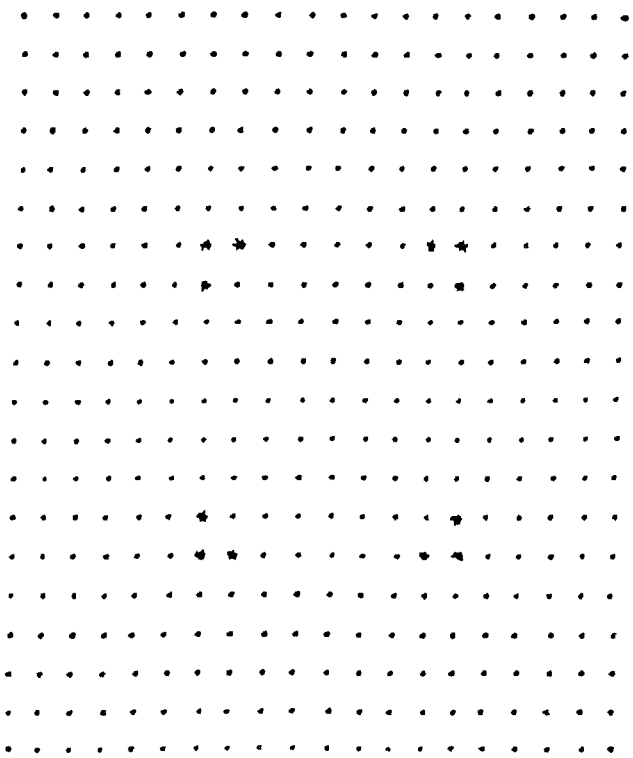
FIG. 10F is a diagram showing the state of the time output data of the basic cells arranged in the matrix form at time t=5.
Figure 10G:
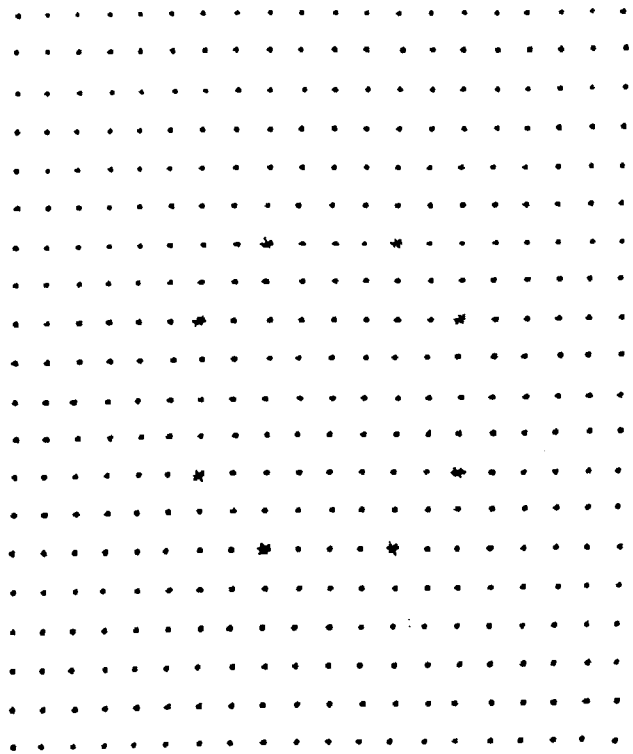
FIG. 10G is a diagram showing the state of the time output data of the basic cells arranged in the matrix form at time t=6.
Figure 10H:
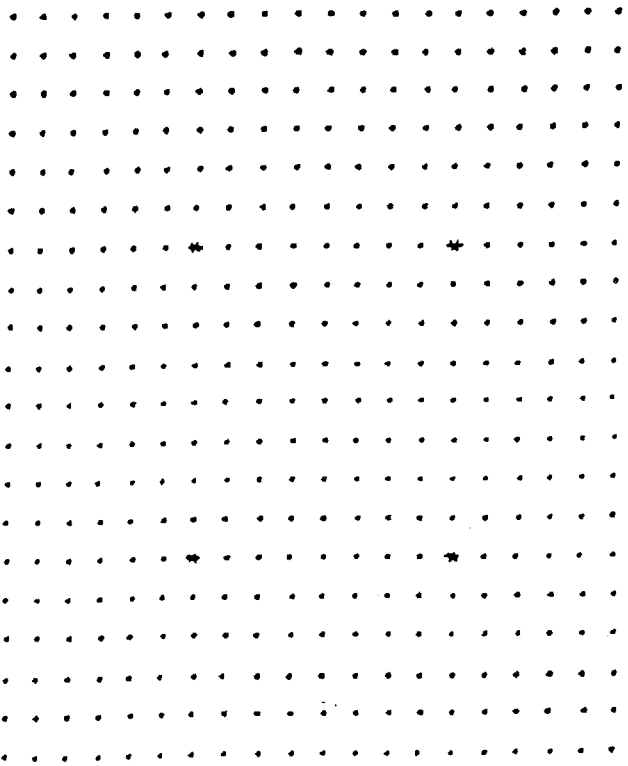
FIG. 10H is a diagram showing the state of the time output data of the basic cells arranged in the matrix form at time t=7.
Figure 10I:
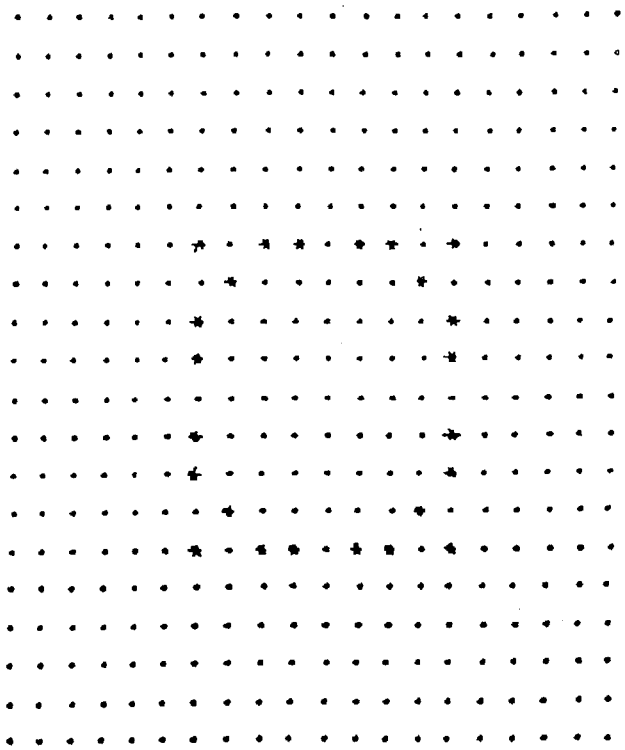
FIG. 10I is a diagram showing the state of the time output data of the basic cells arranged in the matrix form at time t=8.
Figure 10J:
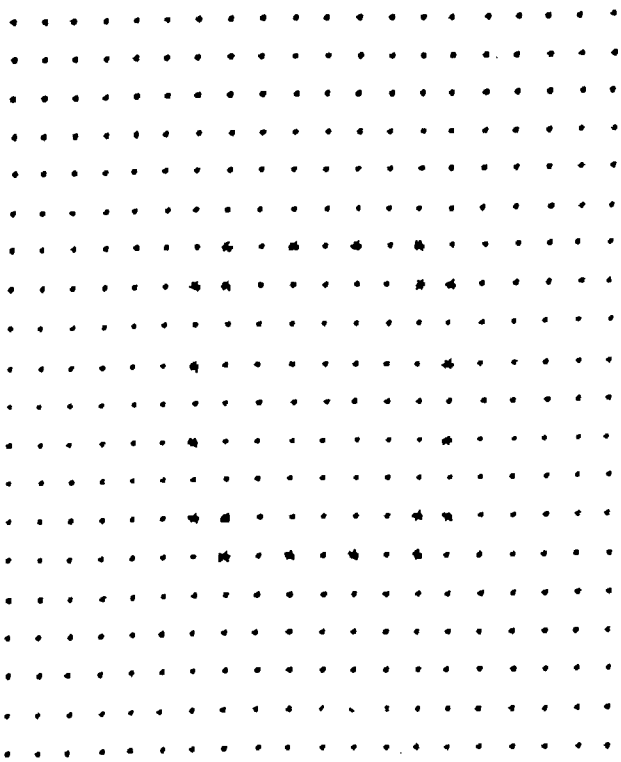
FIG. 10J is a diagram showing the state of the time output data of the basic cells arranged in the matrix form at time t=9.
Figure 10K:
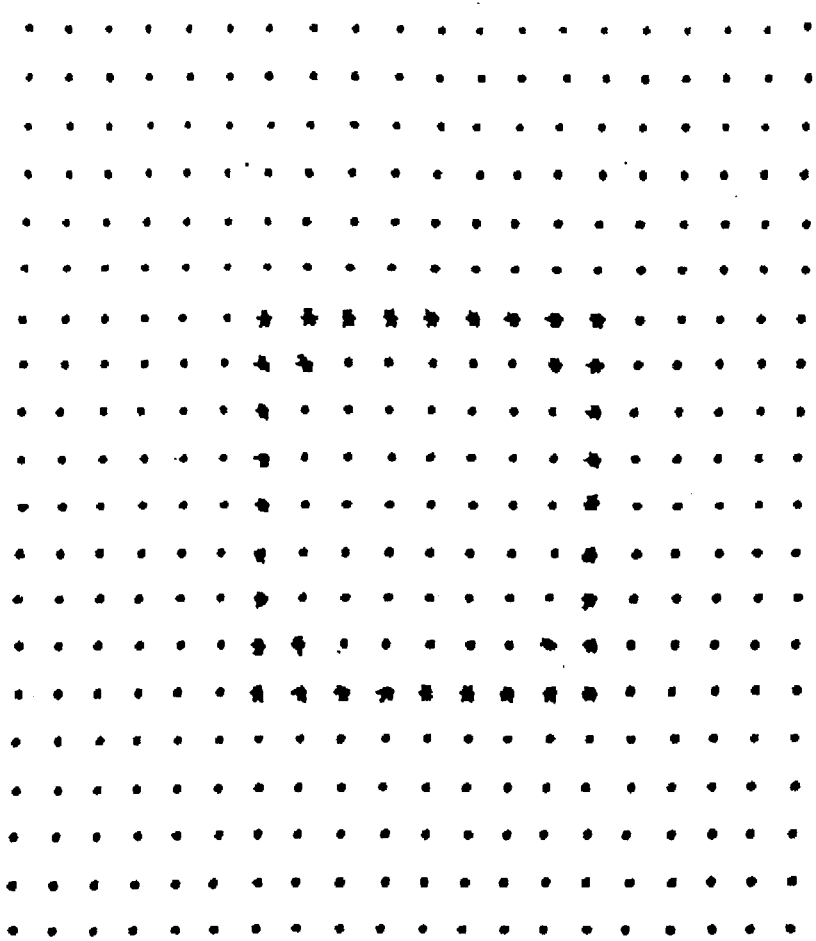
FIG. 10K is a diagram showing the state of the time output data of the basic cells arranged in the matrix form at time t=10.

In FIGS. 10A through 10K there are shown, by way of example, firing pulse pattern variations observed in the case where a filled-in square figure is processed as an image by the spatio-temporal pulse generator formed by interconnecting the space input and output ports of respective basic cells as described previously with respect to FIGS. 4A and 4B. FIGS. 10A through 10K show 20×20=400 basic cells arranged in a matrix form, the dots indicating basic cells whose time output data is logic 0 and the asterisks basic cells whose time output data is logic 1. FIG. 10A depicts the initial state, in which 9×9=81 basic cells at the center portion of the matrix form a square of logic 1. Assuming that the initial state is at time t=0 with the unit time set to 1, FIGS. 10B through 10K correspond to times t=1, 2, . . . , 10, respectively. It will be revealed by inspection of FIGS. 10A through 10K in order time how the firing pulse pattern varies with the lapse of time. The state shown in FIG. 10B (t=1) is identical with the initial state (t=0) in FIG. 10A, and in FIG. 10C only cells at four corner are fired (logic 1). In FIG. 10D (t=3) the time output data of every basic cell is logic 0, but in FIG. 10E (t=4) three cells at the four corner are fired. In FIG. 10K (t=10) the square contour portion of the initial state in FIG. 10A (t=0) is firing despite extra firing just inside the four corners diagonally thereof. In this way, the contour of a figure could be obtained by the image processing spatio-temporal pulse generator according to the sixth aspect of the invention.

Figure 11:
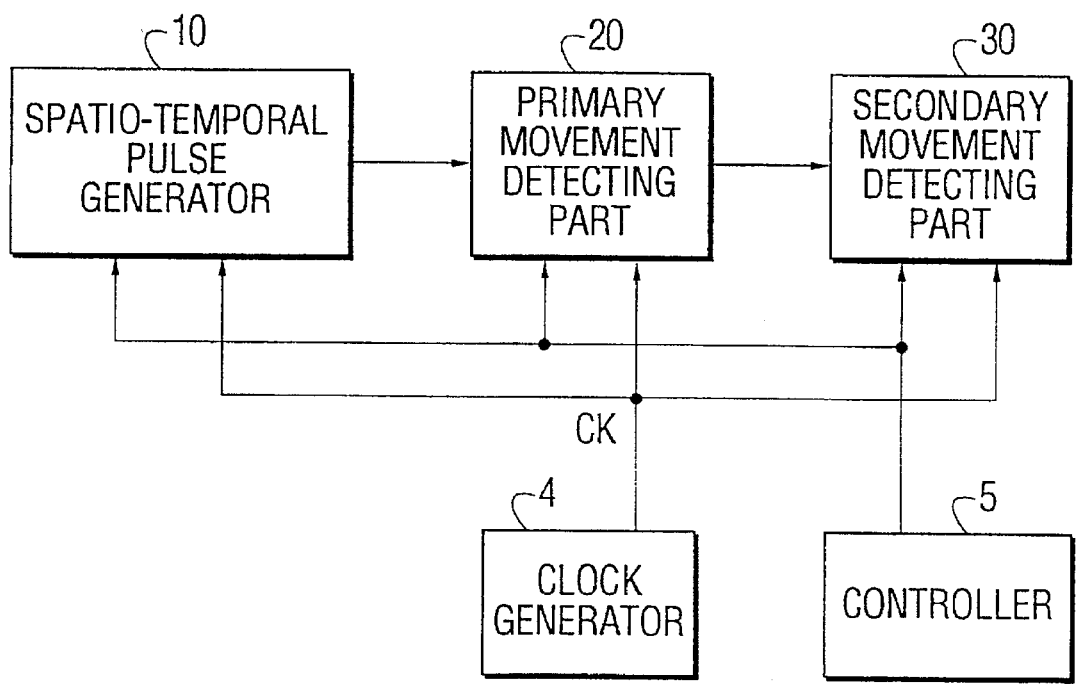
FIG. 11 is a block diagram illustrating the pattern recognition equipment according to the third and fourth aspects of the present invention.

FIG. 11 illustrates in block form the pattern recognition equipment according to the third and fourth aspects of the present invention. The pattern recognition equipment according to the third equipment is configured so that the direction of movement of the firing pulses by the spatio-temporal pulse generator 10 is detected by a primary movement detecting part 20. The primary movement detecting part 20 checks spatio-temporal movement of the firing pulses and detects their straight movement in horizontal, vertical and diagonal directions. The pattern recognition equipment according to the fourth aspect is one that further includes a secondary movement detecting part 30 in the equipment according to the third aspect. The movement of the firing pulses detected by the primary movement detecting part 20 is provided to the secondary movement detecting part 30, in which movement of pulses indicating the direction of movement of the firing pulses is detected. By this, a line component of the image is detected. A clock generator 4 generates a clock signal which has a period of unit time, and the controller 5 generates control signals; these signals are applied to the spatio-temporal pulse generator 10, the primary movement detecting part 20 and the secondary movement detecting part 30.

Figure 12B:
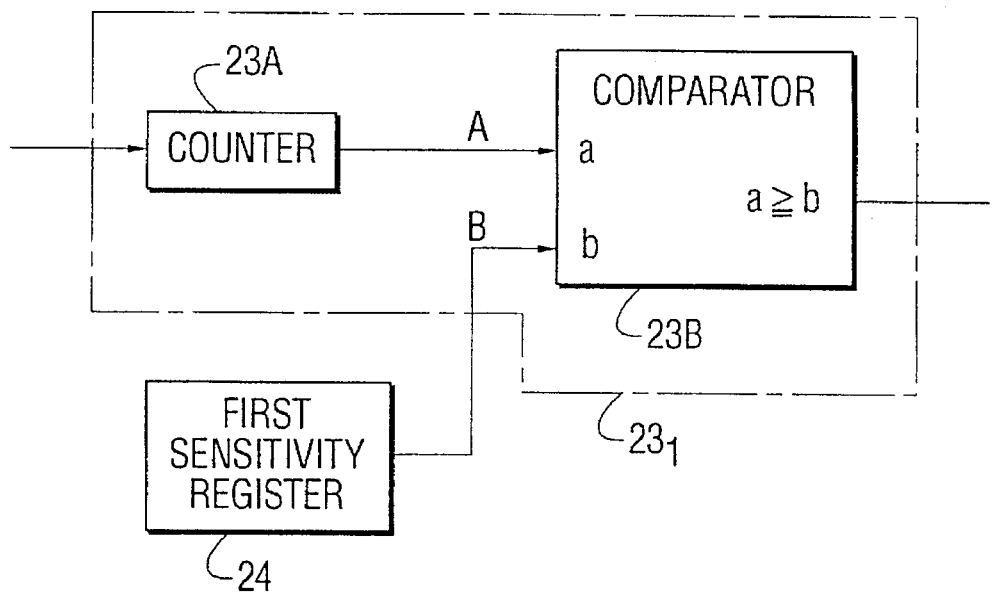
FIG. 12B is a block diagram illustrating the construction of a motion detecting part in FIG. 12A.
Figure 12A:
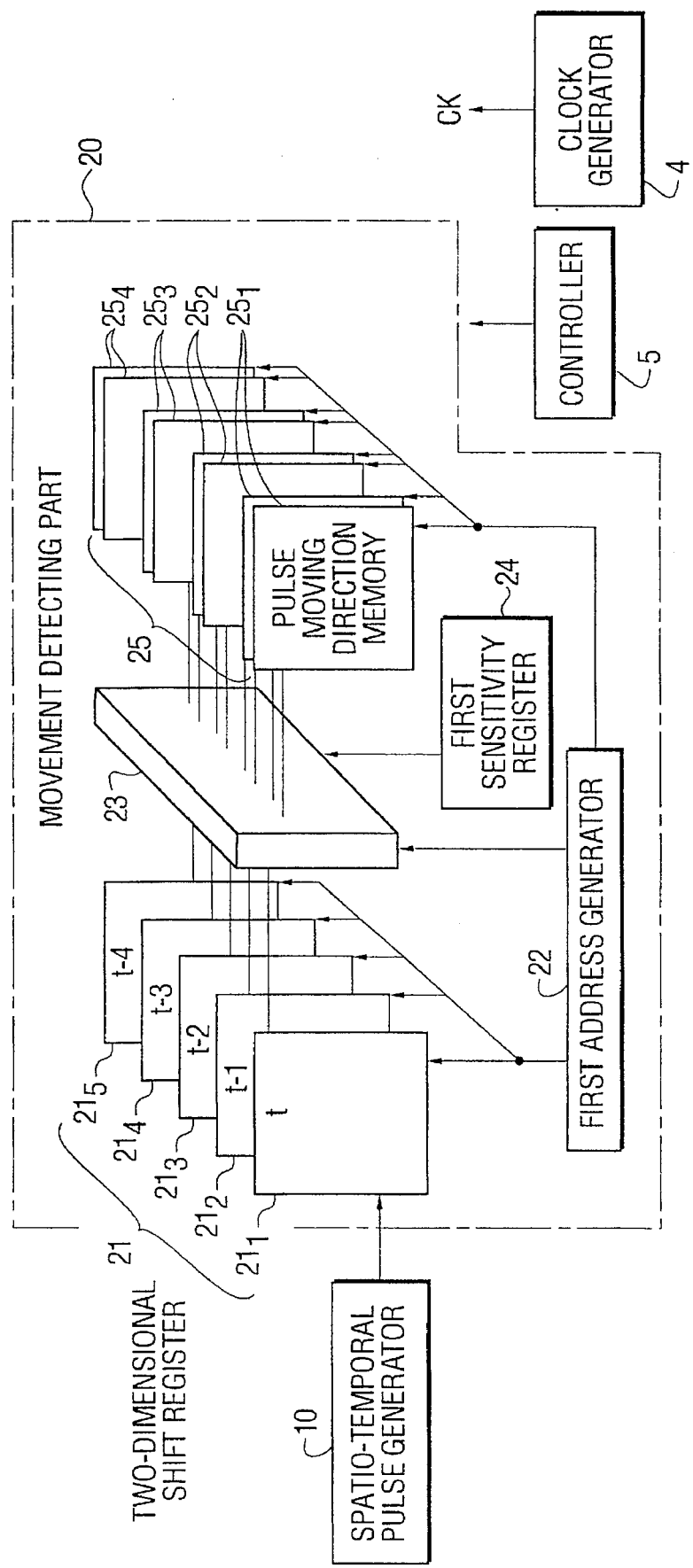
FIG. 12A is a detailed block diagram of a primary operation detecting part in FIG. 11.
Figure 13:
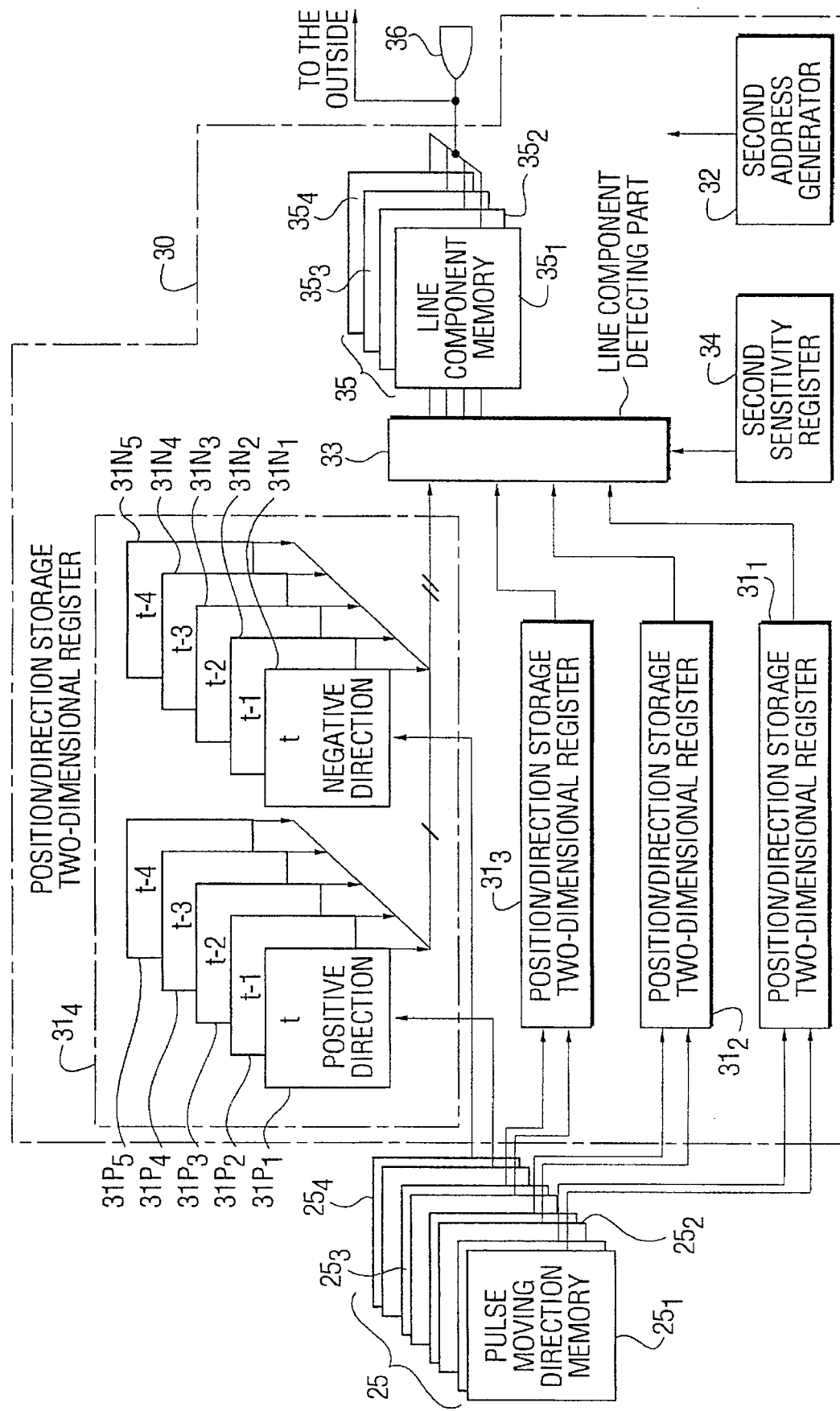
FIG. 13 is a detailed block diagram of a secondary operation detecting part in FIG. 11.

FIGS. 12A, 12b and 13 illustrates somewhat detailed circuit configurations of the primary movement detecting part 20 and the secondary movement detecting part 30 in the pattern recognition equipment of FIG. 11. As shown in FIG. 12A, the primary movement detecting part 20 comprises a time series two-dimensional shift register 21, a movement detecting part 23, a first address generator 22, a first sensitivity register 24 and a pulse moving direction memory 25. As depicted in FIG. 13, the secondary movement detecting part 30 comprises a position/direction storage two-dimensional shift register 31, a line component detecting part 33, a second sensitivity register 34, a line component memory 34 and a second address generator 35. The clock generator 4 generates a clock signal CK having a period of unit time, and the controller 5 generates control signals; these signals are fed to the spatio-temporal pulse generator 10, the two-dimensional shift register 21, the movement detecting part 23, the pulse moving direction memory 25, the first address generator 22, the position/direction storage two-dimensional shift register 31, the second address generator 32, the line component detecting part 33 and the line component memory 35.

Figures 14, 15:
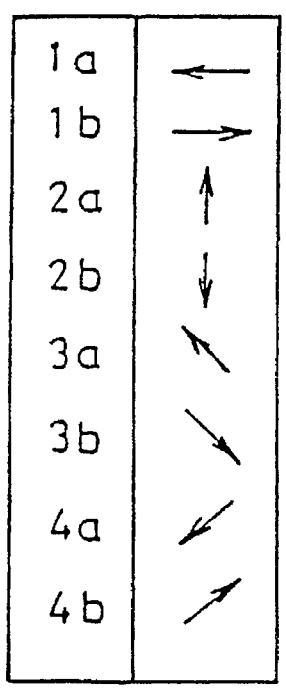
FIG. 14 is a diagram showing an example of firing pulse information.
FIG. 15 is a table showing the directions of motion of firing pulses and symbols indicating them.

In FIG. 12A, firing pulse information $a^{t+1}$ from all the basic cells of the spatio-temporal pulse generator 10 are simultaneously provided as two-dimensional information to the first shift stage $21_1$ of the time series two-dimensional shift register 21. The firing pulse information $a^{t+1}$ from the spatio-temporal pulse generator 10 is composed of logic 0 or logic 1 arranged in a matrix form in correspondence to the basic cell matrix array, as shown in FIG. 14, and each logic 0 or logic 1 is output from the time output port $a^{t+1}$ of each basic cell forming the spatio-temporal pulse generator 10 and represents a segmental element or contour that is the feature amount of the image. FIG. 14 is a diagrammatic showing of firing pulse information from the spatio-temporal pulse generator 10 composed of 20×20=400 basic cells arranged in a matrix form, logic 1 indicating the firing cell position.

To store the whole firing pulse information of the above-mentioned matrix cells, the first shift stage $21_1$ of the time series two-dimensional shift register 21 is formed by registers arranged in the same matrix form as the basic cell matrix array forming the spatio-temporal pulse generator 10, and the register of one bit in the matrix corresponds to one basic cell in the matrix array. Thus, the number of registers forming the two-dimensional shift stage $21_1$ is the same as the number of basic cells forming the spatio-temporal pulse generator 10. The two-dimensional shift stages $21_1$ through $21_5$ are exactly identical in construction, and one-bit registers at the respective corresponding positions on the matrixes are sequentially cascade-connected to form the time series two-dimensional shift register 21. When firing pulse information is captured into the two-dimensional shift stage $21_1$ at time t−4, it is shifted to the register at each corresponding position on the two-dimensional shift stage $21_2$ at time t−3. At the same time, the two-dimensional shift stage $21_1$ is supplied with new firing pulse information at time t−3 from the spatio-temporal pulse generator 10.

While the two-dimensional shift register 21 is configured to directly implement the principles of operation of the present invention, whatever configuration can be used as long as it is equivalent to the principles of operation. For instance, the shift stages $21_1$ through $21_5$ may each be formed by a one-bit two-dimensional memory, preferably, a dual port memory for image use. In such a case, the firing pulse information from the spatio-temporal pulse generator 10 is written into the first memory $21_1$, then it is read out therefrom and written into the second memory $21_2$, followed by the repetition of similar read and write operations to thereby shift the firing pulse information to the memories $21_3$, $21_4$ and $21_5$ in a sequential order. Since it is obvious to electrical circuit engineers what type of clocks should be chosen for read and write use, depending on what memories are used to form the two-dimensional shift register 21, no description will be given in this respect. Alternatively, such time series data processing may be performed entirely by a computer.

At time t−2, the firing pulse information in the two-dimensional shift stage $21_2$ is shifted to the two-dimensional shift stage $21_3$, then the firing pulse information in the two-dimensional shift stage $21_1$ is shifted to the two-dimensional shift stage $21_2$, and then new firing pulse information at time t−2 is shifted to the two-dimensional shift stage $21_1$ from the spatio-temporal pulse generator 10. At time t−1, the firing pulse information in the two-dimensional shift stage $21_3$ is shifted to the two-dimensional shift stage $21_4$, then the firing pulse information in the two-dimensional shift stage $21_2$ is shifted to the two-dimensional shift stage $21_3$, then the firing pulse information in the two-dimensional shift stage $21_1$ is shifted to the two-dimensional shift stage $21_2$, and then new firing pulse information at time t−1 is shifted to the two-dimensional shift stage $21_1$ from the spatio-temporal pulse generator 10.

Thereafter firing pulse information is similarly shifted, and immediately after the elapse of time from time t−4 to t, respectively pieces of firing pulse information generated by the spatio-temporal pulse generator 10 at times t−4 through t are stored in the two-dimensional shift stages $21_5$ through $21_1$ forming the two-dimensional shift register 21. That is, at arbitrary time t there are respectively held in the two-dimensional shift stages $21_1$ through $21_5$ pieces of firing pulse information of arbitrary five consecutive states among 11 states of the firing pulse information shown in FIGS. 10A through 10K. Inspection of the two-dimensional shift stages $21_1$ through $21_5$ reveals movement (the relationship between time and position) of firing pulses.

It is the movement detecting part 23 that detects the movement of firing pulses. The matrix-arranged registers the two-dimensional shift stages $21_1$ through $21_5$ are addressable independently for each stage; an arbitrary one-bit register is specified by row and column addresses which are generated by the first address generator 22 and the contents of the specified register are read out by an unshown read signal from the first address generator 22 and provided to the movement detecting part 23. To detect the movement (its direction as well) of firing pulses, the directions of firing pulses in the two-dimensional shift stages $21_1$ through $21_5$ are sequentially detected for the address (i, j) corresponding to each basic cell position (i, j) of the matrix-arranged basic cells. The direction of movement of firing pulses at each address (i, j) is defined, relative to the address (i, j) in the central two-dimensional shift stage $21_3$, by one address position in each of pairs of shift stages $21_1$, $21_2$ and $21_4$, $21_5$ in front of and behind the stage $21_3$, as shown in Table 1 described later.

The first address generator 22 generates the reference address (i, j) while updating it in accordance with the order of scanning the matrix and, at the same time, generates four more addresses each of which defines each direction to be detected at each reference address (i, j).

The movement detecting part 23 detects the movement of firing pulses in the manner described below. For example, when the reference address (i, j) is being generated at time t−2, if logic "1" is read out of that address in the two-dimensional shift stage $21_3$ (that is, if a firing pulse is detected), the firing state in eight direction defined in predetermined Table described later, at that position (i, j), is checked for each of the two-dimensional shift stages $21_1$, $21_2$ and $21_4$, $21_5$. For instance, for the firing address (i, j) in the two-dimensional shift stage $21_3$, the firing stage (logic 1 or not) is checked at an address (i, j−2) of the two-dimensional shift stage $21_1$ where the firing pulse information at time t is stored, at an address (i, j−1) of the two-dimensional shift stage $21_2$ where the firing pulse information at time t−1 is stored, at an address (i, j+1) of the two-dimensional shift stage $21_4$ where the firing pulse information at time t−3 is stored, and at an address (i, j+2) of the two-dimensional shift stage $21_5$ where the firing pulse information at time t−4 is stored. If they are all logic "1," it can be considered that the firing pulse at the address (i, j+2) at time t−4 has moved therefrom to the addresses (i, j+1), (j, j), (i, j−1) and (i, j−2) one after another with the lapse of time t−3, t−2, t−1 and t; thus, this firing pulse can be considered to have moved from right to left in the column direction while staying on the same row. That is, it might also be said that the firing pulse has passed through the position (i, j) from right to left over the period of from time t−4 to t.

The movement detecting part 23 comprises a plurality of direction detecting circuits respectively corresponding to a plurality of predetermined direction of movement to be detected. An example of one direction detecting circuit $23_1$ is shown in FIG. 12A. Five addresses, described later on, which define the directions of movement to be detected at each reference address (i, j) are provided from the first address generator 22 to the shift stages $21_1$ through $21_5$ of the two-dimensional shift register, and data of a total of five bits read out of the shift stages is fed to a counter 23A. The counter 23A counts the number of logic 1 in the five-bit data and provides the count value A to a terminal a of a comparator 23B. A value B representing the detection sensitivity for the direction of movement to be detected is provided from the first sensitivity register 24 to the other terminal b of the comparator B. When the count value A is above the sensitivity value B, the comparator 23B provides an output of logic 1 on the assumption that the direction of movement has been detected, and when the value A is below B, the comparator provides an output of logic 0 on the assumption that the direction of movement has not been detected. In the first sensitivity register 24 there are preset predetermined sensitivity values B corresponding to the directions to be detected. For example, in the case where the sensitivity value is set to B=5, only when five bits read out of five shift registers by five addresses defining the direction to be detected are all logic 1, it is determined that the direction has been detected. Such direction detecting circuits are provided respectively corresponding to predetermined directions to form the movement detecting part 23.

In the above-described detection of the movement of the firing pulse from right to left, it is determined that the movement of the firing pulse in that direction is detected when the pieces of information read out of the addresses (i, j−2), (i, j−1), (i, j), (i, j+1) and (i, j+2) of the two-dimensional shift stages $21_1$ through $21_5$ are all in the firing state (logic "1"). Where it is desirable to increase the detection sensitivity, it is possible to employ a scheme which determines that the movement of the firing pulse in the desired direction is detected when the bits read out of a predetermined number (three, for example) of addresses, not the five addresses, are in the firing state. This number of addresses is stored in the first sensitivity register and fed to the movement detecting part 23. It is a matter of course, in this case, that the reference address (k, j) of the two-dimensional shift stage $21_3$ need not always be in the firing state. Therefore, it is necessary to detect the movement of the firing pulse at each reference address (i, j) in all of the predetermined directions as described above, regardless of whether the reference address (i, j) of the two-dimensional shift stage $21_3$ is in the firing state.

Table 1 shows addresses of the two-dimensional shift stages $21_1$, $21_2$, $21_4$ and $21_5$ which define various direction of movement at the reference address (i, j) of the two-dimensional shift stage $21_3$. The first line shows times at which firing pulse information was captured, the second line two-dimensional shift stages in which the firing pulse information is stored, and the third and following lines addresses (row, column) to be checked for the firing state.

TABLE 1

|  | Time | | | | |
| --- | --- | --- | --- | --- | --- |
|  | t | t-1 | t-2 | t-3 | t-4 |
|  |  |  | Shift Stage |  |  |
|  | $21_1$ | $21_2$ | $21_3$ | $21_4$ | $21_5$ |
| Direction 1a | (i,j−2), | (i,j−1), | (i,j), | (i, j+1), | (i,j+2) |
| Direction 1b | (i,j+2), | (i,j+1), | (i,j), | (i, j−1), | (i,j−2) |
| Direction 2a | (i−2,j), | (i−1,j), | (i,j), | (i+1, j), | (i+2),j |
| Direction 2b | (i+2,j), | (i+1,j), | (i,j), | (i−1, j), | (i−2,j) |
| Direction 3a | (i−2,j−2), | (i−1,j−1), | (i,j), | (i+1, j+1), | (i+2, j+2) |
| Direction 3b | (i+2,j+2), | (i+1,j−1), | (i,j), | (i−1, j−1), | (i+2, j−2) |
| Direction 4a | (i+2,j−2), | (i+1,j−1), | (i,j), | (i−1, j+1), | (i−2, j+2) |
| Direction 4b | (i−1,j+2), | (i−1,j+1), | (i,j), | (i+1, j−1), | (i+2, j−2) |

In FIG. 15 there are shown the relationships between the reference numerals 1a, 1b, 2a, 2b, 3a, 3b, 4a and 4b indicating directions in Table 1 and actual directions. That is, 1a is the direction from right to left, 1b the direction from left to right, 2a the direction from bottom to top, 2b the direction from top to bottom, 3a the direction from bottom right to top left, 3b the direction from top left to bottom right, 4a the direction from top right to bottom left, and 4b the direction from bottom left to top right.

While Table 1 gives definitions of the above-noted eight directions, the following direction may also be considered as another direction. Direction 5: (i−1, j−2), (i, j−1), (i, j), (i, j+1), (i+1, j+2)

In general, it is also possible to use such a "direction" as defined below in a wide sense. Direction 6: (i−a, j−b), (i−c, j−d), (i, j), (i+e, j+f), (i+g, j+h)

The direction of movement of firing pulses thus detected is stored in the pulse moving direction memory 25 for subsequent processing. the pulse moving direction memory 25 is made up of pulse moving direction memories $25_1$ through $25_4$ corresponding to the predetermined directions to be detected. The pulse moving direction memories $25_1$ through $25_4$ are each formed by a pair of memory planes, wherein pieces of information on the pulse movement in opposite directions are stored, respectively. Upon detection of the direction of movement of the firing pulse at the reference address (i, j) by the movement detecting part 23, a "1" is written at the address (i, j) in the pulse moving direction memories $25_1$ through $25_4$ corresponding to the detected direction. The pair of memory planes are configured in the same fashion as the register matrix array of each two-dimensional shift stage; alternatively, if there is an address area where no direction of pulse movement is required, the memory configuration may be made smaller.

For example, when the firing pulse has moved across the reference address (i, j) in the direction 1a over a period of time from t−4 to t, a "1" is stored in the address (i, j) of a first one of the pair of memory planes of the pulse moving direction memory $25_1$. When the firing pulse has moved across the reference address (i, j) in the direction 4b over a period of time from t−4 to t, a "1" is written in the address (i, j) of a second one of the pair of memory planes of the pulse moving direction memory $25_4$. The address (i, j) is specified using a row address and a column address which are fed from the first address generator 22 to the pair of memory planes of each of the pulse moving direction memories $25_1$ through $25_4$, respectively.

In the secondary movement detecting part 30 shown in FIG. 13, it is detected how the moving direction detected positions written into the memory planes $25_1$ through $25_5$ of the pulse moving direction memory 25 of the aforementioned primary movement detecting part 20, for each direction of movement, shift every unit time; that is, the direction of their shift is detected. The secondary movement detecting part 30 closely resembles the primary movement detecting part 20 in principles of operation. In the following description, logic "1" representing the detection of the direction of movement corresponding to the firing pulse will be referred to as a moving direction firing pulse. Position/direction storage two-dimensional shift registers $31_1$ through $31_4$, provided corresponding to the respective directions of movement, correspond to the time series two-dimensional shift register 21, the line component detecting part 33 corresponds to the movement detecting part 23, and the line component memory 35 corresponds to the pulse moving direction memory 25.

The pieces of moving direction firing pulse information corresponding to all pixels of one frame or matrix, which is generated in each of the memory planes $25_1$ through $25_4$ of the pulse moving direction memory 25, are simultaneously fed to the corresponding position/direction storage two-dimensional shift registers $31_1$ through $31_4$, and the respective directions of the moving direction firing pulses are detected by the line component detecting part 33 and the written into memory planes $35_1$ through $35_4$ of the line component memory 35 corresponding to the respective detected directions. The primary movement detecting part 20 and the secondary movement detecting part 30 differ mainly in the amount of data handled. That is, the primary movement detecting part 20 handles "one sheet" of firing pulse information disposed in a two-dimensional matrix, whereas the secondary movement detecting part 30 handles moving direction firing pulse information of matrix planes of the same number as that of predetermined directions of movement, since the moving direction firing pulses are handled separately for each direction. This can be understood from the fact that the matrix plane of the firing pulse information from the spatio-temporal pulse generator 10 is "one," whereas the pulse moving direction memory 25 is formed by 4×2=8 memory planes.

More in detail, the pulse moving direction memory 25 comprises the four sets of pulse moving direction memory planes $25_1$ through $25_4$ and each set is formed by two memory planes, as described previously. In the first memory plane of the respective set, the moving direction firing pulse information of one frame in the positive directions (1a, 2a, 3a, 4a in FIG. 15) is written while being updated upon each generation of the clock CK. The pieces of moving direction firing pulse information of one frame from the pulse moving direction memories for each clock are input into and shift in the position/direction storage two-dimensional shift registers $31_1$ to $31_4$ provided corresponding to the respective directions of detection. The position/direction storage two-dimensional shift registers $31_1$ through $31_4$ are each comprised of five positive position/direction storage two-dimensional shift stages $31P_1$ through $31P_5$ and five negative position/direction storage two-dimensional shift stages $31N_1$ through $31N_5$.

For example, new moving direction firing pulse information (of one frame), which is read out of the first memory of the pulse moving direction memory $25_4$ upon each generation of the clock, is input into the positive position/direction storage two-dimensional shift stage $31P_1$ of the position/direction storage two-dimensional shift register $31_4$ and then passes through the shift stages $31P_2$ through $31P_5$ one after another. Similarly, new moving direction firing pulse information which is read out from the second memory of the pulse moving direction memory $25_4$ upon each generation of the clock is input into the negative position/direction storage two-dimensional shift stage $31N_1$ of the two-dimensional shift register $31_4$ and then passes through the shift stages $31N_2$ through $31N_5$ one after another. As is the case with the two-dimensional shift register 21 in FIG. 12, the moving direction firing pulse information outputs from the five positive position/direction storage two-dimensional shift stages $31P_1$ through $31P_5$ and the five negative position/direction storage two-dimensional shift stages $31N_1$ through $31N_5$ are read out by five addresses which are generated by the second address generator 32 and define the directions at the respective reference addresses, and the read-out information outputs are fed to the line component detecting part 33 independently of one another.

The input of the moving direction firing pulse information from the memory planes $25_1$ through $25_3$ of the pulse moving direction memory 25 into the position/direction storage two-dimensional shift registers $31_1$ through $31_3$ is also carried out in the same manner as described above. Since the five positive position/direction storage two-dimensional shift stages $31P_1$ through $31P_5$ and the five negative position/direction storage two-dimensional shift stages $31N_1$ through $31N_5$ of each of the shift registers $31_1$ through $31_4$ are exactly identical in operation, a description will be given only of the first memory of the memory plane $25_4$ of the pulse moving direction memory 25, the five positive position/direction storage two-dimensional shift stages $31P_1$ through $31P_5$ of the shift register $31_4$, the line component detecting part 33 and the line component memory 35.

The secondary movement detecting part, which made up of the first memory of the memory plane $25_4$ of the pulse moving direction memory 25, the five position time series position/direction storage two-dimensional shift stages $31P_1$ through $31P_5$, the line component detecting part 33, the line component memory 35, the second address generator 32 and the second sensitivity register 34, is substantially identical in construction and operation, with exceptions mentioned below, to the primary movement detecting part made up of the spatio-temporal pulse generator 10, the five-stage time series two-dimensional shift register 21, the movement detecting part 23, the pulse moving direction detecting memory 25, the first address generator 22 and the first sensitivity register 24 as shown in FIG. 12A. A first exception is that the line component detecting part 33 is made equivalent to a set of eight movement detecting parts 23, since the secondary movement detecting part 30 processes information eight times as much as the primary movement detecting part 20. A second exception is that only when the pulse movement in the respective direction is detected simultaneously at the same addresses (i, j) of the paired positive and negative shift stages of the shift registers $31_1$ through $31_4$, the line component detecting part 33 determines that a line component exists and writes a "1" in the address (i, j) of the corresponding memory plane $35_4$ of the line component memory 35. Hence, the number of memory planes of the line component memory 35 is one-half of that of pulse moving direction memory 25.

As the result of the operation of the secondary movement detecting part 30, for example, horizontal, vertical, first diagonal and second diagonal direction detected results are stored in the line component memory planes $35_1$, $35_2$, $35_3$ and $35_4$, respectively. The information stored in the line component memory 35 is provided to the outside or displayed on a display 36 as required. This information indicates the direction of movement of the firing pulse moving direction, in other words, the direction of movement of a firing pulse segment.

In the above, the pulse moving direction memory pairs $25_1$ through $25_4$ may be omitted and, in such a case, moving direction firing pulses corresponding to the directions of movement of the respective firing pulses detected in the movement detecting part 23 can be fed directly to corresponding ones of the position/direction storage two-dimensional shift registers $31_1$ through $31_4$.

Figure 16:
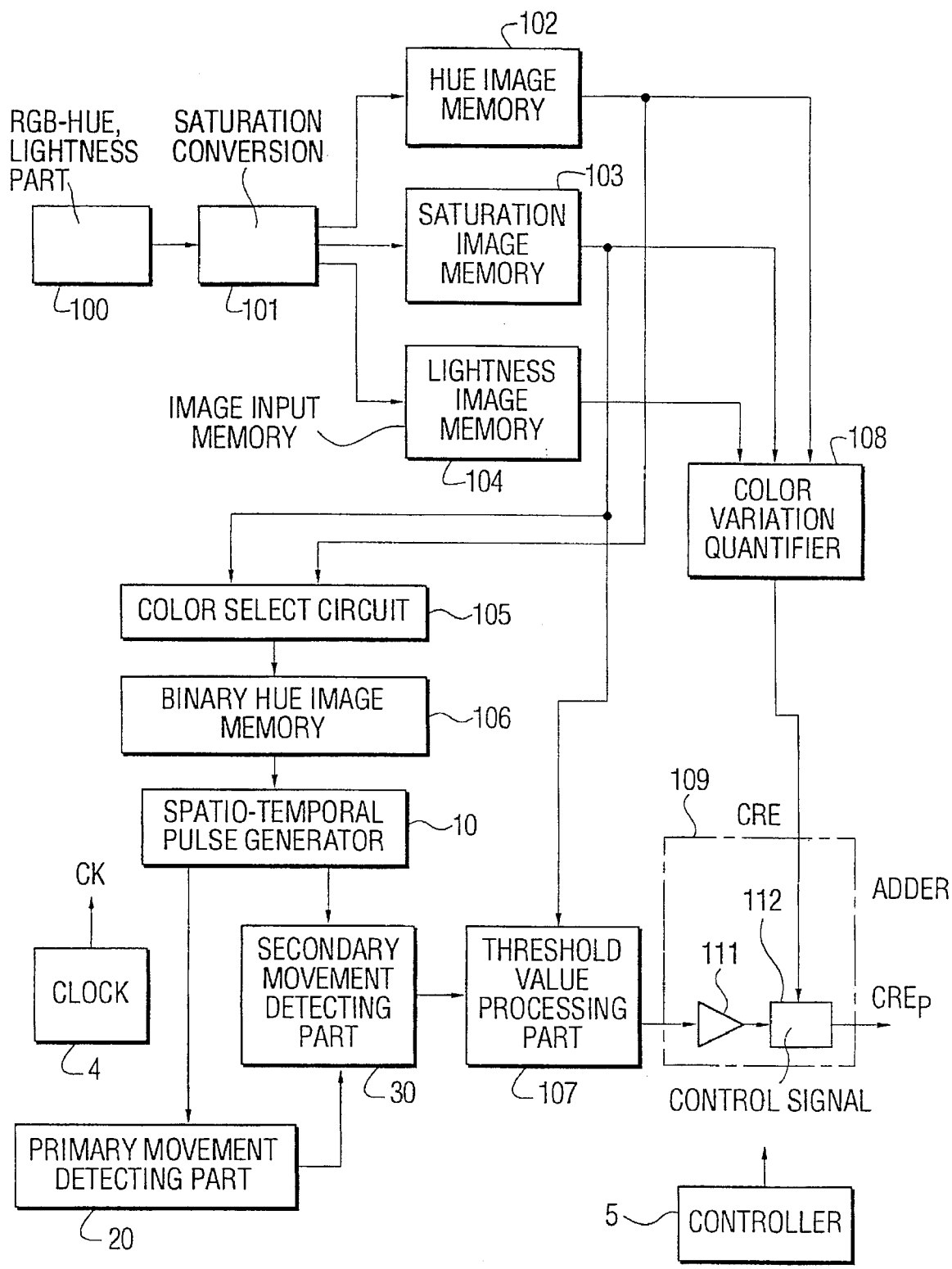
FIG. 16 is a block diagram illustrating an embodiment of the pattern recognition equipment according to the fifth aspect of the present invention which permits a quantitative assessment of a display pattern.

FIG. 16 illustrates an embodiment according to the fifth aspect of the present invention. This embodiment is pattern recognition equipment which permits a quantitative estimation of color reproduction errors in color images through utilization of the FIG. 13 device which detects vertical horizontal and slanted stripes in images as line components. In an image input memory 100 there are input and stored pieces of image data on a CCD color-varying image, a liquid crystal TFT (Thin Film Transistor) panel image, an EB (Electron Beam) testing circuit pattern image, etc. The image data read out of the image input memory 100 is provided to a color image conversion part 101, wherein red, green and blue color image data is converted by an HLS, HCV or HSI converting method into hue image data indicating the kind of color, saturation image data indicating the saturation of color and lightness image data indicating the lightness of color, which are stored in a hue image memory 102, a saturation image memory 103 and a lightness image memory 104, respectively.

For the pixel position of data having a value in a certain range indicating, for example, red, in the hue image memory 102, a color select circuit 105 writes a "1" to produce binary hue image data when saturation data at the same pixel position in the saturation image memory 103 is above a certain threshold value. The binary hue image data on the hue of each of, for example, 12 colors thus produced is stored in a binary hue image memory 106. The binary hue image data for each hue is input into the afore-mentioned spatio-temporal pulse generator 10. The firing pulses generated by the spatio-temporal pulse generator 10 are fed to the primary movement detecting part 20. The primary movement detecting part 20 examines spatio-temporal movement of the firing pulses and detects the direction of their straight horizontal, vertical and diagonal movement. The thus detected firing pulse movement is provided to the secondary movement detecting part 30, wherein the shift of the direction of the firing pulse movement, in other words, movement as a segment is detected.

In a threshold value processing part 107 in FIG. 16, the saturation of a horizontal (side-to-side) line component, a vertical (top to bottom) line component and two slanted diagonal line components, obtained for the binary hue image data of each hue as described above, at the pixel positions where these line components exist are read out of the saturation image memory 103 and the mean value of the saturation is obtained as the strength of each line component. The sum of horizontal line component strengths of the 12 hues thus obtained is used as a horizontal line strength h, the sum of vertical line component strengths as a horizontal line strength v, the sum of the one slanted line component strengths as a slanted line strength d and the sum of the other slanted line component strengths as a slanted line strength u.

For basic cell matrixes of three different tile sizes which permit an accurate detection of lines of image, such as 3 by 3, 4 by 4 and 10 by 10 tile sizes, horizontal line strengths $h_1$, $h_2$, $h_3$, vertical line strengths $v_1$, $v_2$, $v_3$ and slanted line strengths $d_1$, $d_2$, $d_3$, $u_1$, $u_2$, $u_3$ are obtained in the manner as described above.

On the other hand, the pieces of image data stored in the hue image memory 102, the saturation image memory 103 and the lightness image memory 104 are statistically processed by a color variation quantifier 108 to obtain a quantified color variation output. This quantification can be done, for example, by a method disclosed in Literature 1 cited as the prior art. In Literature 1 a quantified color reproduction error CRE is obtained by the following equation.

$$CRE = RCQ + x \cdot cor + y \cdot str + z \cdot bor \quad (5)$$

RCQ is relative chromaticity quantified, cor is a slanted pattern near the center, str is a striped pattern near the center, and bor is striped pattern near the border. In U.S. Pat. No. 5,204,948 mentioned previously, the last three factors are identified by Im, Pa and Pm and methods for obtaining them are disclosed. In the above, x, y and z are coefficients for coupling them.

The color reproduction error CRE quantified by the statistical processing and the line components which are output in numerical form from the threshold value processing part 107 are fused together by a fusion part 109, from which an ultimate quantified color reproduction error CREp is finally provided. For example, the output by the following equation is provided.

$$CREp = CRE + \alpha_1 h_1 + \beta_1 v_1 + \gamma_1 d_1 + \delta_1 u_1 + \alpha_2 h_2 + \beta_2 v_2 + \quad (6)$$
$$\gamma_2 d_2 + \delta_2 u_2 + \alpha_2 h_3 + \beta_3 v_3 + \gamma_3 d_3 + \delta_3 u_2$$

$\alpha_1$ through $\alpha_3$, $\beta_1$ through $\beta_3$, $\gamma_1$ through $\gamma_3$ and $\delta_1$ through $\delta_3$ are coupling coefficients, which are provided from an adjustment part 111. The line components multiplied by these coefficients and the quantified color reproduction error CRE are added together by an adding part 112, whose output is provided as the ultimate quantified color reproduction error CREp. It is also possible to omit the threshold value processing part 107 and supply the fusion part 109 with maximum to n-th values of each of the horizontal line component h, the vertical line component v, the bottom left-to-top right line component d and the top right-to-bottom left line component u.

As described above, according to the pattern recognition equipment of FIG. 16, a color reproduction error quantified through its statistical property and quantified various line components of respective colors are fused together; hence, there is no fear of outputting a color reproduction error though no such an error exists, or outputting no color reproduction error though a color reproduction error exists. Thus, it is possible to make more accurate quantitative detection of color reproduction errors.

I claim:

1. Pattern recognition equipment comprising a plurality of spatio-temporal pulse firing basic cells arranged in two dimensions, each of said spatio-temporal pulse firing basic cells including:

a time input port;

a plurality of space input ports;

a time output port;

a plurality of space output ports;

time data input means for inputting time input data $a^t$ from said time input port at a timing t;

space data input port means for inputting space input data $b_k$ from said plurality of space input ports at a timing t, where k=0, 1, ..., u, and u is an integer;

calculating means for obtaining, from said time input data $a^t$ and said space input data $b_k$, time output data $a^{t+1}$ and space output data $C_k$, by logical operations defined by following expressions:

$a^{t+1} = Pa$, if $\Sigma b_k \leq S$ and $a^t = Pd$, or $\Sigma b_k < S$ and $a^t = Pa$, $Pd$, if $\Sigma b_k \geq S$ and $a^t = Pa$, or $\Sigma b_k < S$ and $a^t = Pd$, $c_k = q_e$, if $b_k = q_i$ and $a^t = Pa$, or $b_k = q_e$ and $a_t = Pd$, $q_i$, if $b_k = q_e$ and $a^t = Pa$, or $b_k = q_i$ and $a^t = Pd$, where Pa, Pd, $q_e$ and $q_i$ are binary constants, S is a threshold value of a predetermined integer equal to or greater than 1, and $\Sigma b_k$ represents summation of values $b_k$ for k=0 to k=u;

time data output means for outputting, at next timing t+1, said time output data $a^{t+1}$ from said calculating means to said time output port and for providing said time output data as the next time input data $a^{t+1}$ to said time input port; and space data output means for outputting said space output data $C_k$ from calculating means to said space output ports, wherein said space input ports of each of said basic cells are each connected to said space output ports of one of a plurality of other basic cells, and said plurality of space output ports of said each basic cell are each connected to one of said plurality of other basic cells, thereby forming a spatio-temporal pulse generating means.

2. The spatio-temporal pulse generator for image processing use according to claim 1, wherein a space input data delay circuit is provided at each of said space input ports.

3. The pattern recognition equipment according to claim 1, which further comprises control means which, after said time input data is once input as an initial value, causes said time data input means, said space data input means, said calculating means, said time data output means and said space data output means to perform data processing every unit time, using said time output data as the next time input data.

4. The pattern recognition equipment according to claim 1, wherein means for initializing said space input data is provided.

5. The pattern recognition equipment according to claim 1, wherein said plurality of other basic cells connected to said each basic cell are those of the same cell distance from said each basic cell.

6. The pattern recognition equipment according to claim 1, wherein a space output data delay circuit is provided at each of said plurality of space output ports.

7. The pattern recognition equipment of claim 1 further comprising:

a primary movement detecting part which is provided with two-dimensional shift register means supplied with the outputs from said time output ports of said basic cells, respectively, and a movement detecting part for detecting the direction of movement of a pulse from the position of said pulse in each shift stage of said two-dimensional shift register means.

8. The pattern recognition equipment according to claim 7, which further comprises:

a secondary movement detecting part which includes a plurality of position/direction storage two-dimensional shift register means provided corresponding to a plurality of predetermined directions to be detected in said primary movement detecting part and supplied with pulses each representing the existence of a detected direction of movement and which detects, as line component information, the direction of pulse movement from the pulse position in each shift stage of said position/direction storage two-dimensional shift register means; and a plurality of line component memory means wherein said line component information detected by said secondary movement detecting part is stored at an address corresponding to the position where it was detected.

9. The pattern recognition equipment according to claim 8, which further comprises: converting means for converting color image data to hue image data, saturation image data and lightness image data; color select means which produces, for each hue, binary hue data wherein pixel positions are each made a "1" or "0", depending on whether the saturation image data there is above or below a predetermined value, said binary hue data being provided to the space input port of said spatio-temporal pulse generator; means for converting the line component detected by said secondary movement detecting part into numerical form on the basis of the saturation image data corresponding to the pixel position of said line component; quantifying means for obtaining a quantified color reproduction error from said hue image data, said saturation image data and said lightness image data through utilization of their statistical property; and fusing means for fusing said quantified color reproduction error and said line component in numerical form to obtain a finally quantified color reproduction error.

* * * * *